United States Patent
Taguchi

(10) Patent No.: US 6,327,829 B1
(45) Date of Patent: *Dec. 11, 2001

(54) CONNECTING STRUCTURE FOR CONCRETE BLOCK AND CONNECTOR USED THEREFOR

(75) Inventor: Takeo Taguchi, Maebashi (JP)

(73) Assignee: Kaieitechno Co., Ltd., Gunma-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/567,232

(22) Filed: May 9, 2000

Related U.S. Application Data

(63) Continuation of application No. 09/104,668, filed on Jun. 25, 1998, now Pat. No. 6,065,263.

(30) Foreign Application Priority Data

Jun. 27, 1997 (JP) .................................................. 9-187430

(51) Int. Cl.[7] ...................................................... E04B 2/00
(52) U.S. Cl. ........................ 52/583.1; 52/707; 52/127.12; 403/305; 403/306
(58) Field of Search ................................ 52/583.1, 707, 52/127.12; 403/305, 306, 307, 300

(56) References Cited

U.S. PATENT DOCUMENTS

| | | | |
|---|---|---|---|
| 1,637,210 | * 7/1927 | Betts | ................................... 52/707 X |
| 2,163,212 | * 6/1939 | Reddick | ................................... 285/12 |
| 2,264,480 | * 12/1941 | Owen | .................................. 403/296 |
| 2,439,176 | 4/1948 | Mallard . | |
| 3,264,019 | 8/1966 | Houvener et al. . | |
| 3,332,182 | 7/1967 | Mark . | |
| 3,369,334 | 2/1968 | Berg . | |
| 4,752,151 | * 6/1988 | Ashica et al. | .................... 403/307 X |
| 4,796,389 | * 1/1989 | Bini et al. | ............................. 52/63 X |
| 4,850,777 | 7/1989 | Lawrence et al. . | |
| 5,308,184 | * 5/1994 | Bernard | ................................. 403/305 |
| 5,309,691 | 5/1994 | Tolliver et al. . | |
| 5,459,973 | 10/1995 | Baumann . | |
| 5,570,549 | * 11/1996 | Lung et al. | .............................. 52/295 |
| 5,606,839 | 3/1997 | Baumann . | |
| 5,626,054 | * 5/1997 | Rembert et al. | .................. 403/305 X |
| 5,729,952 | 3/1998 | Dahl . | |
| 5,868,554 | * 2/1999 | Giacomino et al. | ............. 403/300 X |
| 6,099,196 | * 8/2000 | Lancelot, III | ......................... 403/313 |

FOREIGN PATENT DOCUMENTS

| | | |
|---|---|---|
| 2216302 | 10/1973 | (DE) . |
| 2427169 | 1/1975 | (DE) . |
| 224895A | 7/1985 | (DE) . |
| 1534886 | 12/1978 | (GB) . |
| 2779836 | 5/1998 | (JP) . |
| 503543 | 2/1976 | (SU) . |

* cited by examiner

*Primary Examiner*—Beth A. Stephan
*Assistant Examiner*—Brian E. Glessner
(74) *Attorney, Agent, or Firm*—Lowe Hauptman Gilman & Berner, LLP

(57) ABSTRACT

A connecting structure of concrete block according to the present invention comprises connecting rods buried in divided blocks, and a connector which exerts forces to attract exposed ends of the connecting rods toward each other and maintains a condition where it exerts predetermined attracting forces. In this connecting structure, the connecting rods are attracted toward each other and the divided blocks are brought into contact with each other under pressure by tightening an external thread portion of a first tightening member into an internal thread hole of a second tightening member with a tool after the divided blocks are combined so as to match cavities thereof with each other.

A connector according to the present invention comprises a first tightening member which is rotatably fitted over an exposed end of a connecting rod of one divided block and a second tightening member which is rotatably fitted over an exposed end of another concrete block. This connector is capable of keeping divided blocks in contact with each other under pressure by exerting attracting forces to the connecting rods opposed to each other when the tightening members are rotatably fitted over the exposed portions of the connecting rods and an external thread portion of the first tightening member is tightened into an internal thread hole of the second tightening member.

4 Claims, 28 Drawing Sheets

FIG. 9(A)
FIG. 9(B)
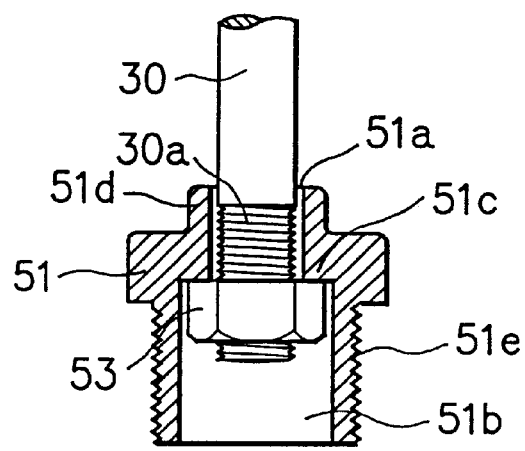
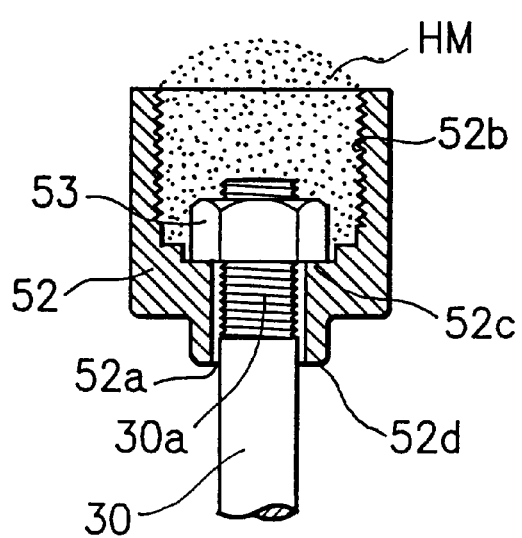
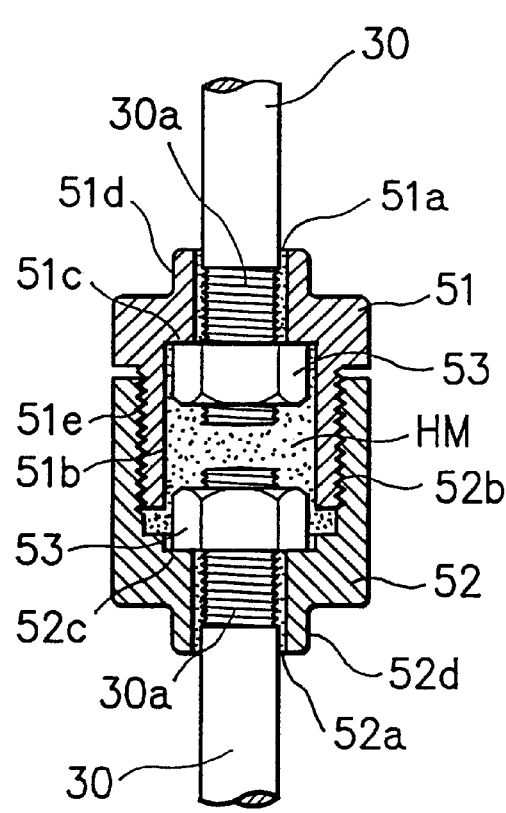

F I G. 28
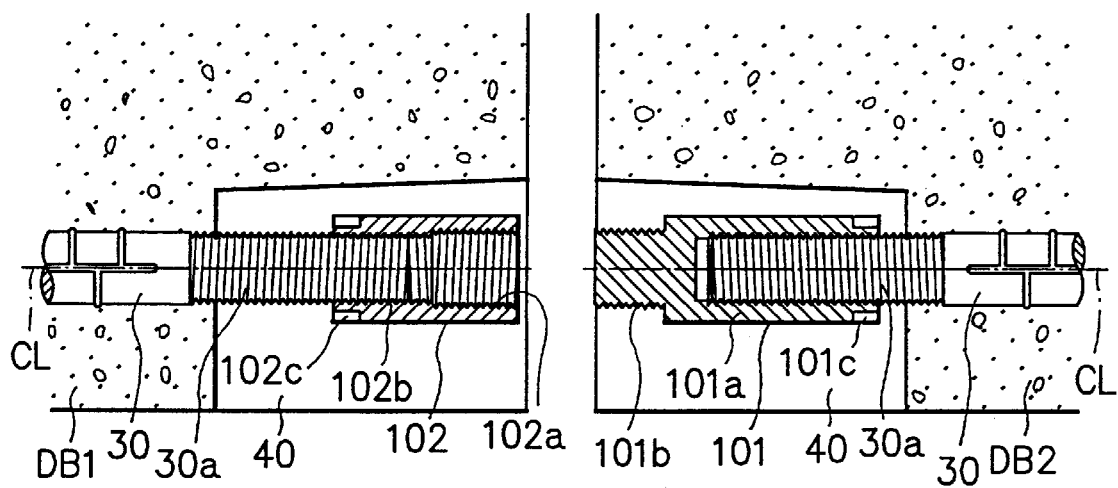

CONNECTING STRUCTURE FOR CONCRETE BLOCK AND CONNECTOR USED THEREFOR

CROSS REFERENCES TO RELATED APPLICATIONS

The present application is a continuation of the patent application entitled "CONNECTING STRUCTURE FOR CONCRETE BLOCK AND CONNECTOR USED THEREFOR", U.S. patent application Ser. No. 09/104,668, filed on Jun. 25, 1998, now issued as U.S. Pat. No. 6,065,263 on May 23, 2000. The disclosure of the above mentioned U.S. Pat. No. 6,065,263 is incorporated by reference herein in its entirety.

BACKGROUND OF THE INVENTION

1. Field of the Invention

The present invention relates to a connecting structure for concrete block which is useful to connect concrete blocks at construction sites and a connector to be used in this connecting structure.

2. Description of the Prior Art

Concrete blocks which are used for building concrete structures such as beams, retaining walls, covered conduits (culverts) and aqueducts are manufactured at locations other than construction sites for enhancing working efficiencies, precisions and quality control levels. When the concrete blocks themselves are large and heavy or have complicated forms, however, they not only increase burdens imposed on transportation works and costs but also require large storage spaces.

Accordingly, it is practiced in these days to preliminarily manufacture the concrete blocks in divided forms, carry these divided blocks to construction sites and connect these divided blocks as occasion demands. For example, a block for a covered conduit which has a predetermined form is preliminarily manufactured as divided upper and lower blocks 201 and 202, and the divided blocks 201 and 202 are connected to each other at a construction site.

Cavities 201a and 202a are formed at intervals in ends of connecting side surfaces of the divided blocks 201 and 202. Further, ends 201b and 202b of internal reinforcement buried in the blocks are exposed in the cavities 201a and 202a.

To couple the divided blocks 201 with 202, the two divided blocks 201 and 202 are combined as shown in the drawing with a packing (not shown) interposed. These divided blocks 201 and 202 are integrated by welding the ends 201b and 202b of the internal reinforcement respectively which are opposed to each other.

However, the connecting method described above requires a prettily long time to complete a series of connecting works even when a plurality of welding workers are engaged with the works since five to ten minutes is necessary to weld the ends of the internal reinforcements at one location, and tends to allow welding qualities to be variable dependently on environmental conditions and abilities of workers.

Further, the packing cannot be sufficiently pressed at the connecting stage simply by welding the ends 201b and 202b of the internal reinforcement to each other. In other words, the two divided blocks 201 and 202 can hardly be connected in an adequate pressure contact condition with the packing interposed, thereby making it difficult to maintain expected airtightness and watertightness.

SUMMARY OF THE INVENTION

A primary object of the present invention is to provide a connecting structure for concrete block which is capable of firmly connecting concrete blocks in an adequate pressure contact condition.

In order to accomplish this object, the present invention provides a connecting structure of concrete block to connect concrete blocks mutually comprising a connecting rod disposed in a concrete block so that an end thereof is exposed in a vicinity of a connecting surface of said concrete block, a connecting rod disposed in another concrete block so that an end thereof is exposed in a vicinity of a connecting surface of said concrete block, and a connector for exerting an attracting forces to the exposed ends of the connecting rods in a condition where the concrete blocks are combined so as to oppose the connecting rods to each other and maintaining the attracting forces.

This connecting structure is capable of firmly connecting the concrete blocks to each other in an adequate pressure contact condition since the connectors exert the forces to the exposed ends respectively of the connecting rods opposed to each other in the directions to attract them toward each other and maintains the condition where the connectors exert the predetermined attracting forces.

Another object of the present invention is to provide a connector which is useful for the connecting structure described above.

In order to accomplish this object, the present invention provides a connector to be used for mutually connecting concrete blocks in which ends of connecting rods are exposed in the vicinities of a connecting surface of said concrete blocks comprising a cylindrical external thread member which has an external thread portion and is rotatably fitted to the exposed end of the connecting rod of one of the concrete blocks, and a cylindrical internal thread member which has an internal thread hole corresponding to the external thread portion and is rotatably fitted to the exposed end of the connecting rod of the other concrete block.

By tightening the external thread member and the internal thread member to each other in a condition where the external thread member is rotatably fitted over the exposed end of the connecting rod of one of the concrete blocks and the internal thread member is rotatably fitted over the exposed end of the connecting rod of the other concrete block, the connector is capable of exerting the forces to the exposed ends of the connecting rods opposed to each other in directions to attract them toward each other and maintaining a condition where it exerts predetermined attracting forces.

The object described above, other objects, features and advantages of the present invention will be apparent from the following description and the attached drawings.

BRIEF DESCRIPTION OF THE DRAWINGS

FIGS. 9(A) and 9(B) are diagrams descriptive of a method to fill a connector with a hardener material;

FIG. 28 is a diagram descriptive of a method to connect divided blocks with the connector shown in FIG. 26;

DESCRIPTION OF THE PREFERRED EMBODIMENTS

Figure 1:
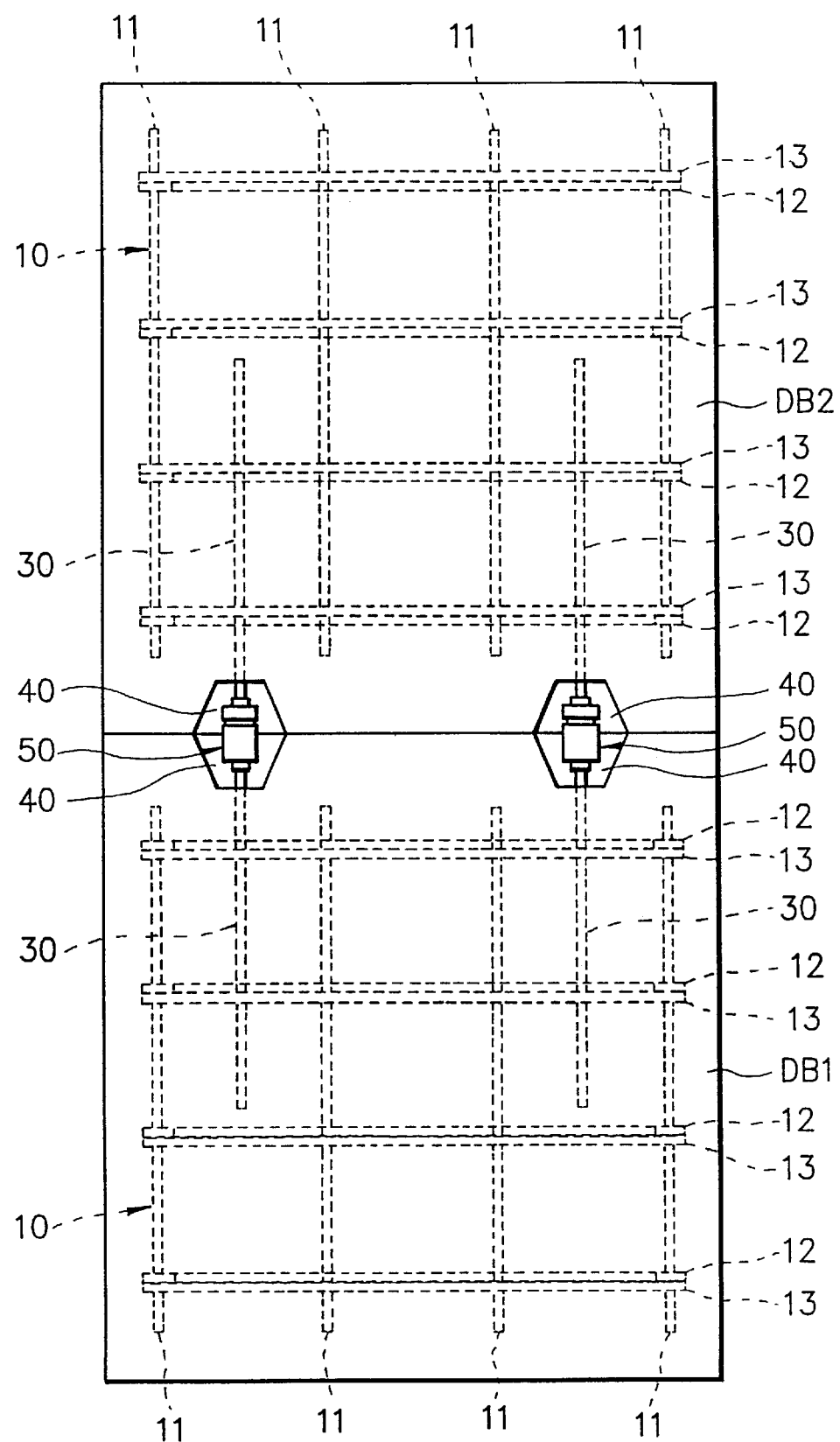
FIG. 1 is a plan view illustrating an embodiment of the connecting structure for concrete block according to the present invention in a condition where divided blocks are connected to each other.
Figure 2:
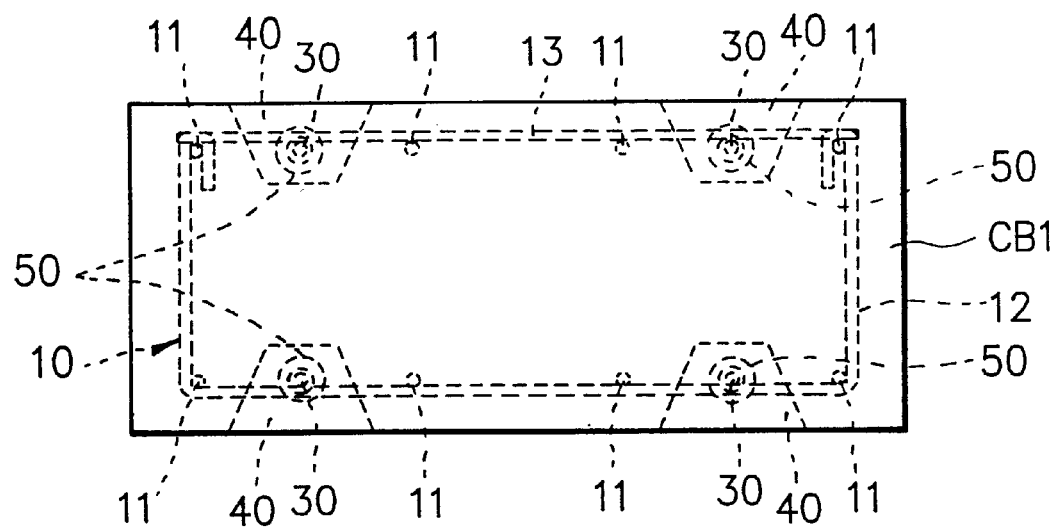
FIG. 2 is a front view of the connecting structure for concrete block shown in FIG. 1.

FIGS. 1 through 5 show an embodiment of the present invention. In FIGS. 1 through 5, reference numerals DB1 and DB2 represent divided blocks, a reference numeral 10 designates an internal reinforcement, a reference numeral 30 denotes a connecting rod and a reference numeral 50 represent a connector.

The divided blocks DB1 and DB2 are configured to compose a beam block, or to be connected in a left-right direction to form a beam block which has a predetermined form (see FIG. 1). These blocks DB1 and DB2 are precast concrete products which are preliminarily manufactured at a location other than a construction site and carried to a construction site in a condition where they are not connected to each other.

Each of the divided blocks DB1 and DB2 has the internal reinforcement 10 for enhancement of its strength. This internal reinforcement 10 consists of eight main bars 11 which are in parallel with one another, four stirrups 12 which are arranged outside the main bars 11 so as to surround the main bars and four auxiliary bars 13 which are arranged so as to connect ends of the stirrups 12, and is integrated by welding or another technique after it is assembled into a form similar to that of the divided block DB1 or DB2. Needless to say, an internal reinforcement which has a structure other than that shown in the drawing may be used as the internal reinforcement or an internal reinforcement which has splice bars (not shown) in parallel with the main bars 11 may be used as the internal reinforcement.

Further, two cavities 40 which have openings on a side of upper or lower surface and a side of a connecting surface are formed at an interval in each of the upper and lower surfaces of the divided block DB1 at a location on the side of the connecting surface and the upper and lower surfaces of the divided block DB2 at a location on the side of the connecting surface.

Furthermore, four connecting rods 30 having a predetermined length are buried in each of the divided blocks DB1 and DB2 so as to be in parallel with the main bars 11. In the embodiment shown in the drawings, deformed bars are used as the connecting rods 30, which are connected to the internal reinforcement 10 by welding or another technique. That is, the divided blocks DB1 and DB2 are manufactured using the internal reinforcements 10 which are integrated with the connecting rods 30. Moreover, each of the connecting rods 30 is equipped at its end with an external thread portion 30a which is exposed in each of the cavities 40.

A thickness of the connecting rod 30 is adequately selected dependently on conditions such as a weight of a divided block to be connected thereto and an external force applied to the beam block after connection. A size of the connector 50 which is described in details later is also adequately selected dependently on the thickness of the connecting rod 30 and conditions which are similar to those described above.

Since a tensile force is exerted to a lower side portion and a compressive force is exerted to an upper side portion in a beam block such as that preferred as the first embodiment, for example, it is preferable to use, on the lower said portion to which the tensile force is exerted, connecting rods which are thicker than those used on the upper side portion to which the compressive force is exerted as the connecting rods 30 and large connectors 50 corresponding to the thicker connecting rods. Needless to say, the connecting rods 30 and the connectors 50 may be used in larger numbers on the lower side portion to which the tensile force is exerted than those used on the upper side portion to which the compressive force is exerted without changing a thickness of the connecting rods and a size of the connectors.

Further, the embodiment is configured to secure a predetermined tensile strength for the connecting rods 30 by using the deformed bars which have surface convexities as the connecting rods 30 and integrating the connecting rods 30 with the internal reinforcements 10. When the predetermined tensile strength is obtained without integrating the connecting rods 30 with the internal reinforcements 10, it is not necessarily required to weld the connecting rods 30 to the internal reinforcements 10.

Figure 3:
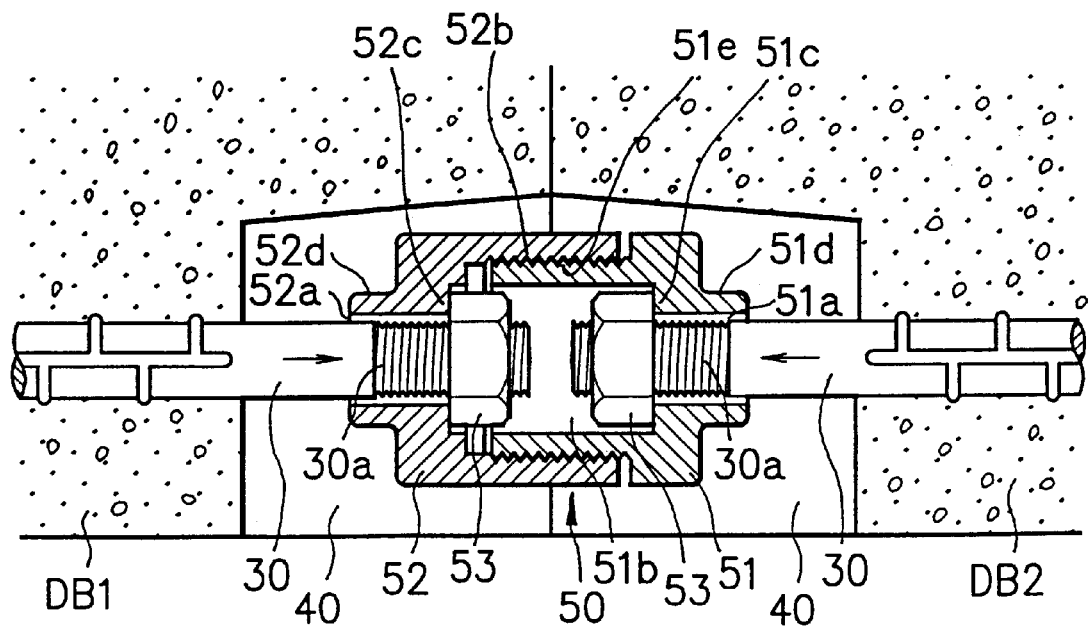
FIG. 3 is an enlarged vertical sectional view illustrating a connector and surrounding parts shown in FIG. 1.
Figure 4:
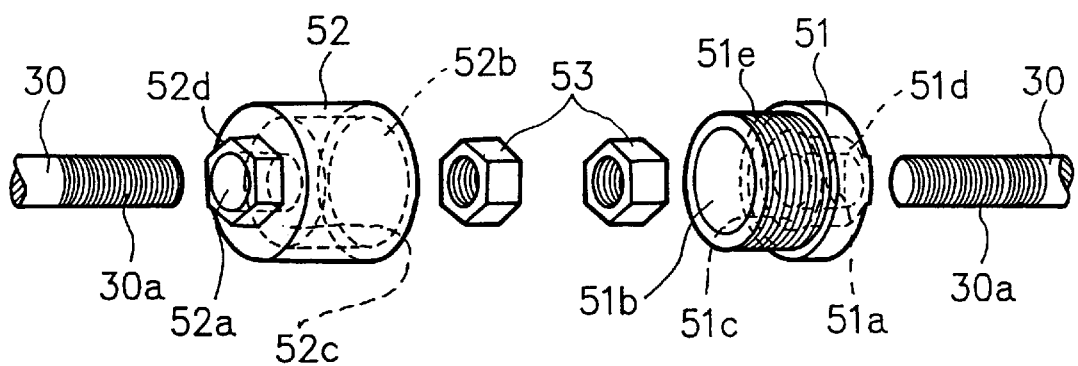
FIG. 4 is an exploded perspective view illustrating the connector shown in FIG. 1.

The connector 50 is composed of a first tightening member 51, a second tightening member 52 and two nuts 53 which can be fitted over the external thread portions 30a of the connecting rods 30 as shown in FIGS. 3 and 4.

The first tightening member 51 has an insertion hole 51a having a diameter slightly larger than an outside diameter of the connecting rod 30 and an insertion hole 51b having a diameter slightly larger than an outside diameter of the nut 53 which are formed by way of a step 51c. Further, a nut-like portion 51d which is engageable with a tool such as a wrench (not shown) is formed at an end of the first tightening member 51 on a side of the insertion hole 51a. Furthermore, an external thread portion 51e is formed on an outside surface of the insertion hole 51b of the first tightening member 51.

The second tightening member 52 has an insertion hole 52a having a diameter slightly larger than the outside diameter of the connecting rod 30 and an internal thread hole 52b corresponding to the external thread portion 51e which are formed by way of a step 52c. Further, a nut-like portion 52d which is engageable with a tool such as a wrench (not shown) is formed at an end of the second tightening member 52 on a side of the insertion hole 52a.

As seen from the drawings, a ridge on the external thread portion 51e of the first tightening member 51 and that on the internal thread hole 52b of the second tightening member 52 are right-handed, whereas ridges on the external thread portions 30a of the connecting rods 30 are left-handed. Needless to say, it is possible to connect the divided blocks as expected by using a right-hand thread on at least one of the external thread portions 30a of the connecting rods 30 or selecting left-hand threads as the ridges on the external thread portion 51e of the first tightening member 51 and the internal thread hole 52b of the second tightening member 52.

Figure 5:
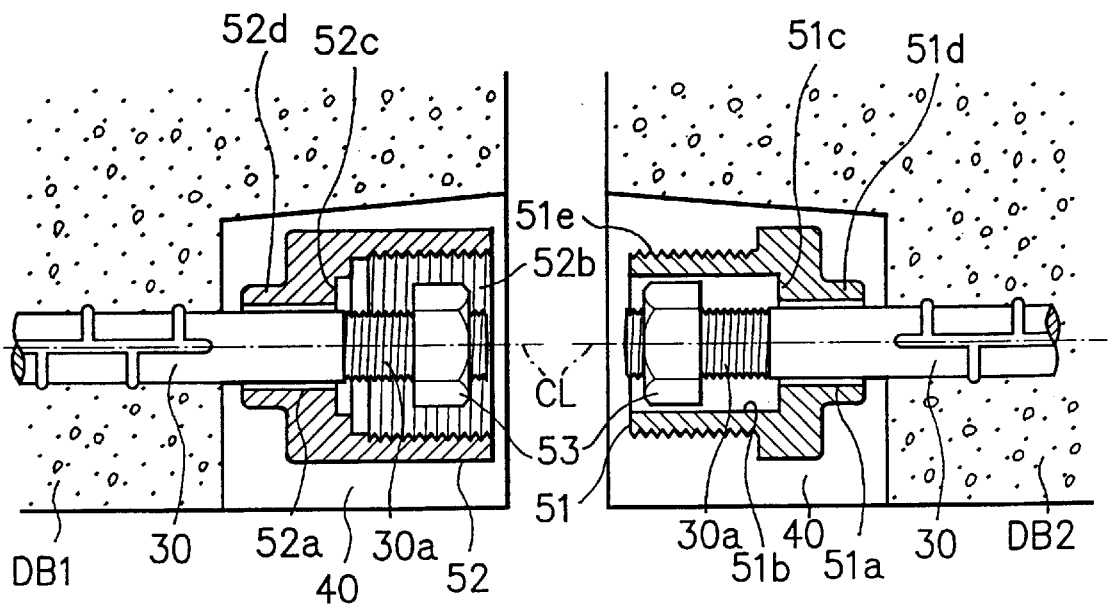
FIG. 5 is a diagram descriptive of connecting method for divided blocks.

In order to connect the two divided blocks DB1 and DB2 with the connector 50, preliminarily works are carried out to fit the second tightening member 52 over the exposed portion of the connecting rod 30 of the divided block DB1 and fit the nut 53 to the external thread portion 30a as shown in FIG. 5. Further, the first tightening member 51 is preliminarily fitted over the exposed portion of the connecting rod 30 of the other divided block DB2 and the nut 53 is fitted to the external thread portion 30a as shown in FIG. 5. Dependently on relationship of sizes of the parts composing the connectors 50 versus a distance between the connecting rods 30 opposed to each other, the preliminary works described above may be carried out after the divided blocks are combined as described later.

Determination of a location at which the nut 53 is to be placed is facilitated by preliminarily tracing a reference mark on each of the external thread portions 30a. Further, it is possible to prevent variations of the location of the nut 53 by preliminarily coating an inside surface of the nut 53 with an adhesive agent or using two thin nuts as the nut 53 and fixing one of the nuts with the other.

Then, the connecting surfaces of the two divided blocks DB1 and DB2 are combined with each other with a packing (not shown) interposed so that the cavities 40 match with each other, i.e., so that centerlines CL of the connecting rods 30 are aligned with each other (see FIG. 5). By the way, convexities and concavities which are formed on the connecting surfaces of the divided blocks DB1 and DB2 so as to engage with each other will facilitate the combining work described above and enhance a shear strength of the block after connection.

Then, the external thread portion 51e of the first tightening member 51 is lightly tightened into the internal thread hole 52b of the second tightening member 52 by turning, with fingertips, the tightening members 51 and 52 which are fitted over the connecting rods 30 opposed to each other.

Then, the external thread portion 51e of the first tightening member 51 is tightened into the internal thread hole 52b of the second tightening member 52 by turning the tightening members 51 and 52 in directions reverse to each other or turning only one tightening member while holding the other tightening member in a condition where tools are engaged with the nut-like portion 51d of the first tightening member 51 and the nut-like portion 52d of the second tightening member 52.

As the external thread portion is tightened into the internal thread hole, the nuts 53 which are fitted over the external thread portions 30a of the connecting rods 30 are brought into contact with the step 51c of the first tightening member 51 and the step 52c of the second tightening member 52 respectively. When the tightening of the external thread portion is further continued subsequently, the connecting rods 30 are pulled in directions indicated by arrows in FIG. 3, whereby the connecting surfaces of the divided blocks DB1 and DB2 are brought into contact with each other under pressure with no gap by way of the packing. To bring the connecting surfaces of the divided blocks DB1 and DB2 under pressure with no eccentricity, it is desirable to carry out the tightening works described above equally for the four connectors 50.

Though the tightening exerts a tensile force to each connecting rod 30 in the direction indicated by the arrow in FIG. 3, the connecting rod 30 cannot be pulled out of the divided block at the tightening stage since strength (force bonding to concrete) sufficient to cope with the tensile force is secured for the connecting rod 30. Further, cracks cannot be formed due to locally concentrated stresses since the tensile force exerted to each connecting rod 30 is dispersed in the divided blocks by way of concrete contact surface of the connecting rod.

Furthermore, there are reserved slight clearances between the insertion hole 51a of the first tightening member 51 and the connecting rod 30, and between the insertion hole 52a of the second tightening member 52 and the connecting rod 30, whereby a deviation between the centerlines CL of the connecting rods 30 opposed to each other, if exists, is absorbed by the clearances mentioned above and the connecting works can be adequately carried out.

Furthermore, the ridges on the external thread portion 51e of the first tightening member 51 and in the internal thread hole 52b of the second tightening member 52 are formed in a direction reverse to that of the ridges on the external thread portions 30a of the connecting rods 30, whereby the nuts 53 which have been fitted over the external thread portions 30a of the connecting rods 30 cannot be loosened during the tightening works described above. Needless to say, a similar loosening preventive effect can be obtained by preliminarily coating the inside surface of the nut 53, which is fitted over the external thread portion, with an adhesive agent or using two thin nuts as the nut 53 and fixing one of the nuts with the other as described above.

The tightening works described above are continued until the divided block DB1 and the divided block DB2 are brought into contact with each other under a predetermined pressure by way of the packing, whereby the two divided blocks DB1 and DB2 are firmly connected to each other.

After completing the tightening works, a hardener material (not shown) is charged into each of the cavities 40 and is hardened. A reinforced mortar which consists of a mixture of mortar and a resin or the like is preferably usable as the hardener material. Such a hardener material prevents the connectors 50 from being loosened and enhances shear strength of connected portions. Now, a series of the connecting works have been completed.

The block connecting structure described above is capable of firmly connecting the two divided blocks DB1 and DB2 by bringing the connecting surfaces of the divided blocks DB1 and DB2 into contact under pressure by way of the packing in a simple procedure to turn at least either of the first tightening member 51 and the second tightening member 52 with a tool after the divided blocks DB1 and DB2 are combined with each other.

Further, the block connecting structure is capable of sufficiently pressing the packing with the pulling forces to the connecting rods 30 opposed to each other by the tightening works described above, thereby connecting the divided blocks DB1 and DB2 in an adequate pressure-contact condition so as to secure expected airtightness and watertightness.

The block connecting structure described above is capable of maintaining the condition where the pulling forces are exerted to the connecting rods 30 opposed to each other, thereby being capable of preventing the connection between the divided blocks DB1 and DB2 from being loosened by external forces, thereby maintaining the connected condition favorably for a long time.

Furthermore, the block connecting structure described above permits configuring the connectors 50 compact and adding the connectors 50 to the divided blocks DB1 and DB2 in simple procedures at a later stage, thereby eliminating the necessity to keep the connectors 50 attached to the divided blocks before connection, and providing a merit to store and manage the connectors 50 at a location other than the location of the connecting works.

Figure 6:
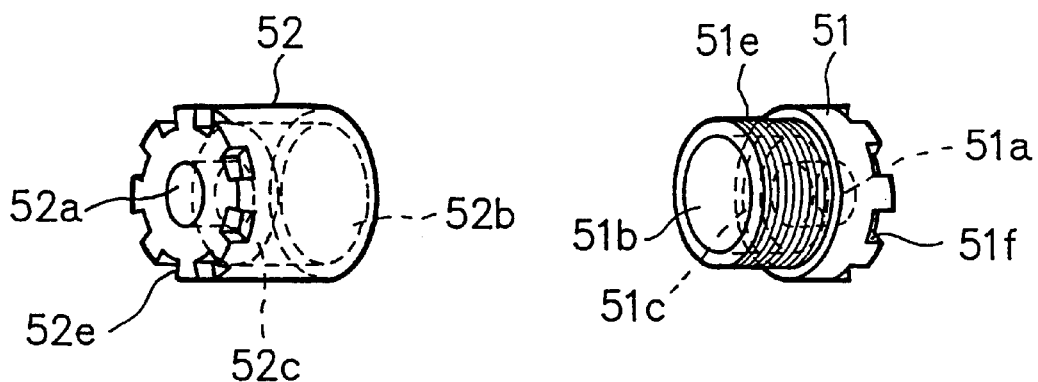
FIG. 6 is a perspective view illustrating a modification of the connector shown in FIG. 1.

Moreover, it is possible to form tooth-ring portions (portions at which rectangular grooves are arranged at equal intervals in circumferential directions) 51f and 52e as shown in FIG. 6 in place of the nut-like portion 52d of the first tightening member 51 and the nut-like portion 52d of the second tightening member 52. In this case, tools which have protrusions or the like engageable with the tooth-ring portions 51f and 52e are used as the tightening tools.

Figure 7:
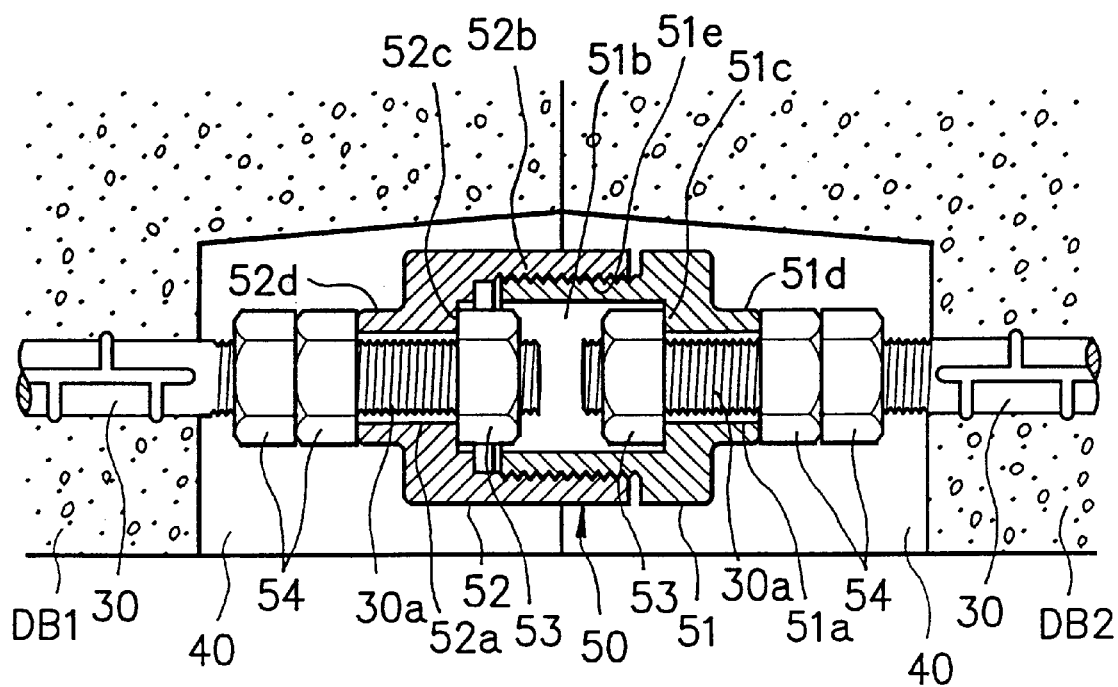
FIG. 7 is a vertical sectional view illustrating a modification of the connector shown in FIG. 1 and corresponding to FIG. 3.
Figure 8:
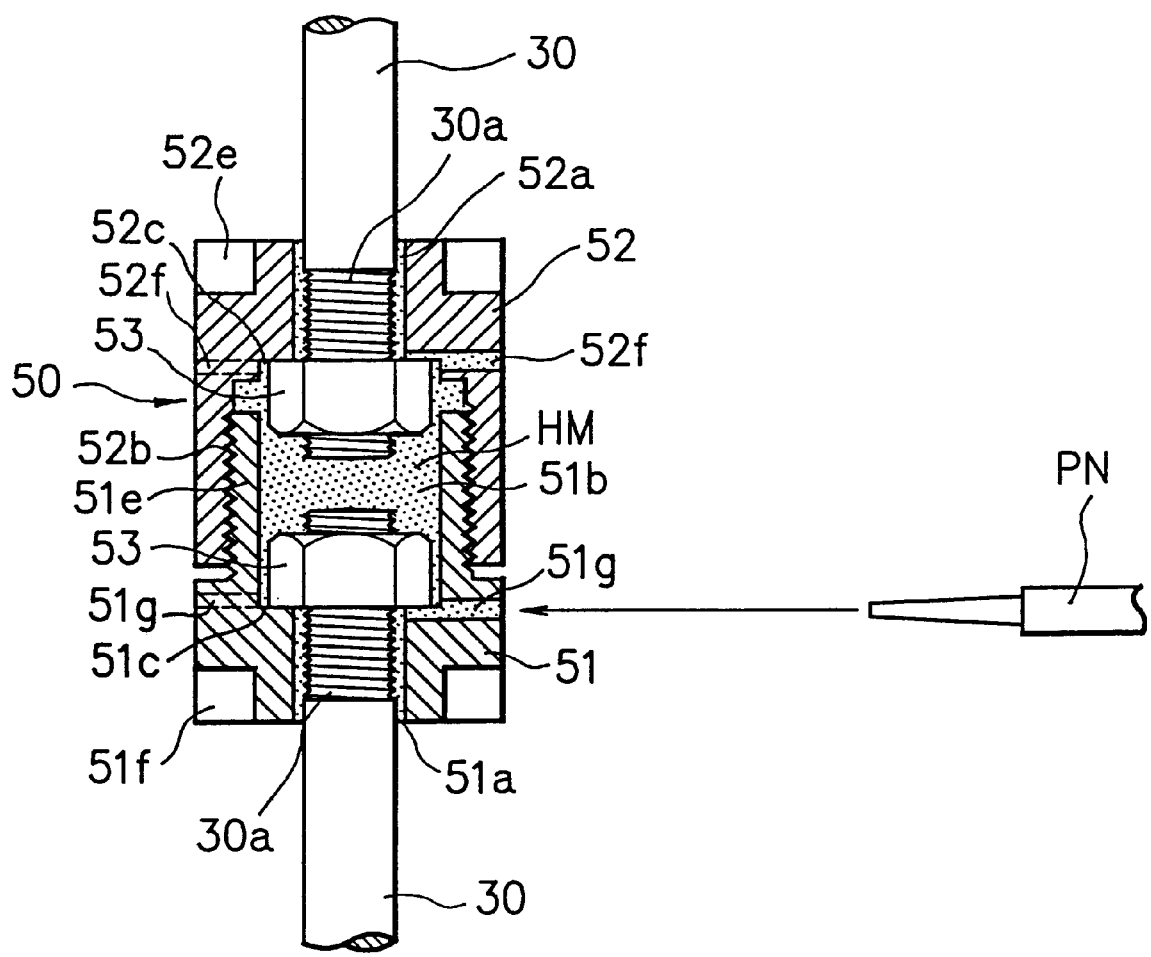
FIG. 8 is a diagram descriptive of a method to fill a connector with a hardener material.

In addition, a method illustrated in FIG. 7, 8 or 9 may be adopted as occasion demands to maintain favorable connecting strength, watertightness and airtightness by preventing the connecting rods 30, tightening member 51 and tightening member 52 from being plastically deformed by external forces applied to the block after connection.

The method illustrated in FIG. 7 is configured to preliminarily fit two fixing nuts 54 over the external thread portion 30a of the connecting rod 30, and fix the first tightening member 51 and the second tightening member 52 by tightening the fixing nuts 54 after completing the tightening works of the first tightening member 51 and the second tightening member 52. Needless to say, the tightening members can be fixed similarly even with a single fixing nut 54.

The method illustrated in FIG. 8 is configured to form, in an outside surface of the first tightening member 51, at least one filling slot 51g which communicates with the insertion holes 51a and 51b, and form, in an outside surface of the second tightening member 52, at least one filling slot 52f which communicates with the insertion hole 52a and internal thread hole 52b so that a hardener material HM is poured into either of the filling slot through a nozzle PN. The poured hardener material HM is hardened after penetrating into gaps between the internal thread hole 52b and the external thread portion 51e, between the insertion hole 51a and the connecting rod 30, and between the insertion hole 52a and the connecting rod 30. A hardener material which is prepared by mixing an extender or the like with an epoxy or polyester resin is preferably usable as the hardener material HM.

The method illustrated in FIGS. 9(A) and 9(B) is configured to tighten the external thread portion 51e of the first tightening member 51 into the internal thread hole 52b of the second tightening member 52 after pouring a predetermined amount of the hardener material HM into the internal thread hole 52b of the second tightening member 52. As the external thread portion 51e is tightened, the hardener material HM penetrates into the gaps between the internal thread hole 52b and the external thread portion 51e, between the insertion hole 51a and the connecting rod 30, and between the insertion hole 52a and the connecting rod 30, and is hardened after completing the tightening works. The hardener material HM used for this method is similar to that described above. The penetration of the hardener material HM into the gaps can be accelerated by vibrating such as shaking the tightening members 51 and 52 in the course of tightening the external thread portion 51e of the first tightening member 51 into the internal thread hole 52b of the second tightening member 52.

Figure 10A:
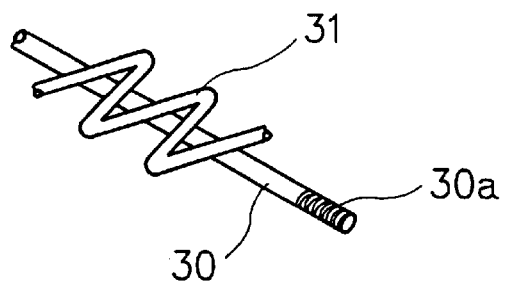
FIGS. 10(A) through 10(C) are perspective views illustrating modifications respectively of a connecting rod shown in FIG. 1.
Figure 10B:
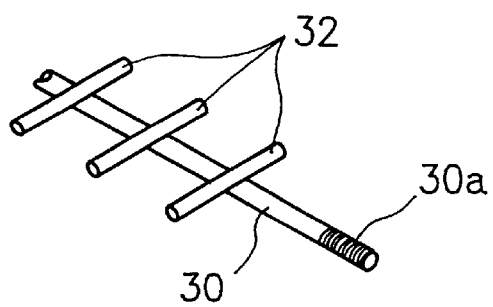
Figure 10C:
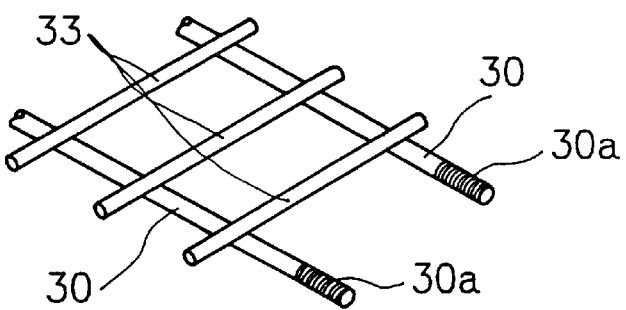
Figure 11:
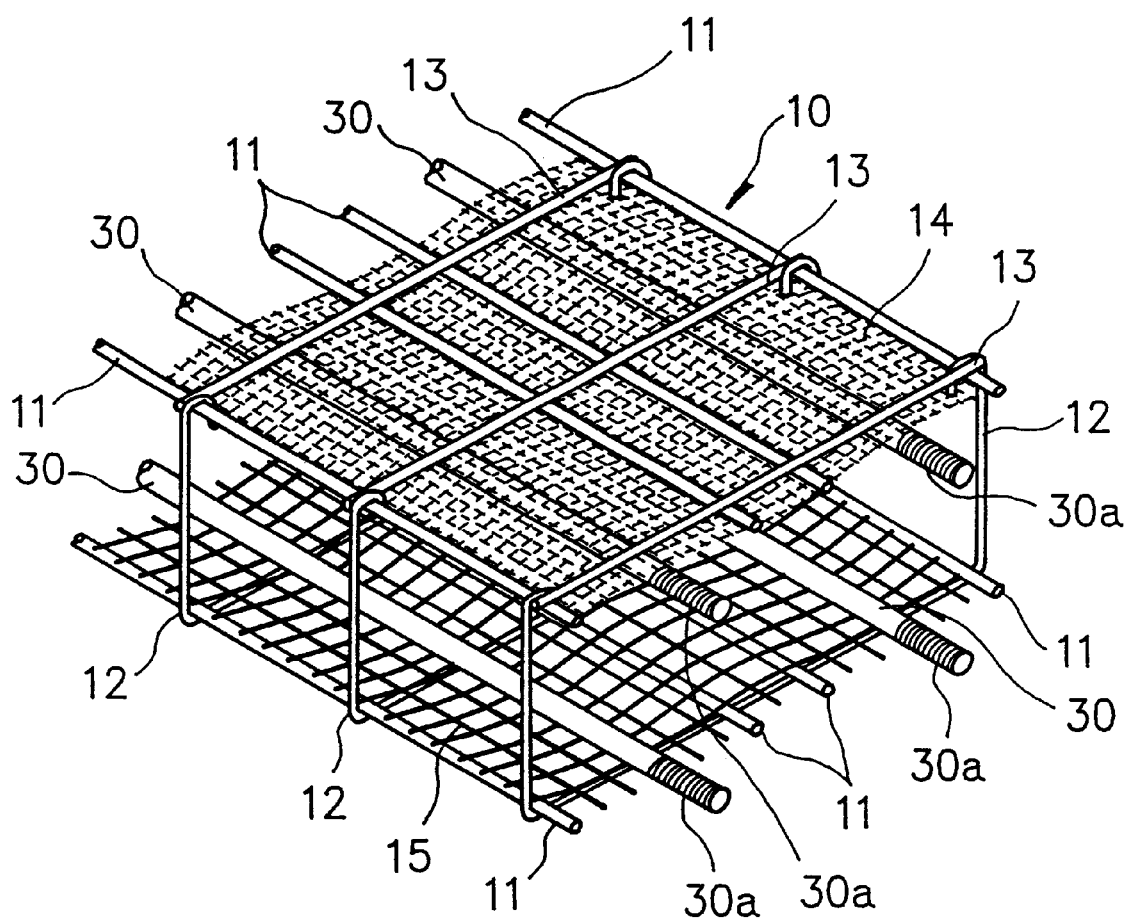
FIG. 11 is a perspective view illustrating a modification of an internal reinforcement shown in FIG. 1.

Though the deformed bars which are straight are used as the connecting rods 30 in the embodiment described above, a connecting rod shown in FIG. 10(A), 10(B) or 10(C) is capable of enhancing a tensile strength by increasing a force of the connecting rod 30 adhesive to concrete. The connecting rod 30 shown in FIG. 10(A) has a reinforcing member 31 which is bent into a corrugated form and joined in a longitudinal direction. The connecting rod 30 shown in FIG. 10(B) has a plurality of rod-shaped reinforcing members 32 which are joined in parallel at intervals in the longitudinal direction. The connecting rod 30 shown in FIG. 10(C) has two connecting rods 30 to which a plurality of rod-like reinforcing members 33 are joined in parallel at intervals in the longitudinal direction. Needless to say, a similar effect is expectable by bending the connecting rod 30 itself so as to have a corrugated portion, an L-shaped portion or the like.

Though the internal reinforcement 10 is composed of the main bars 11, the stirrups 12 and the auxiliary bars 13 in the embodiment described above, resistance to brittleness of the divided blocks themselves can be enhanced by interposing a resin mesh 14 or a metal mesh 15 braided in a lattice pattern or another pattern between the main bars 11 and the connecting rods 30. Further, stresses between the connecting rods 30 and concrete to which the connecting rods adhere which are exerted at the stage of block connection can be dispersed effectively with the resin mesh 14 or the metal mesh 15 and further dispersed effectively by the internal reinforcement 10. By the way, the metal mesh 15 may be preliminarily connected to at least either of the internal reinforcement 10 and the connecting rods 30.

Now, examples of connectors which have structures other than those described above will be described with reference to FIGS. 12 through 28.

Figure 12:
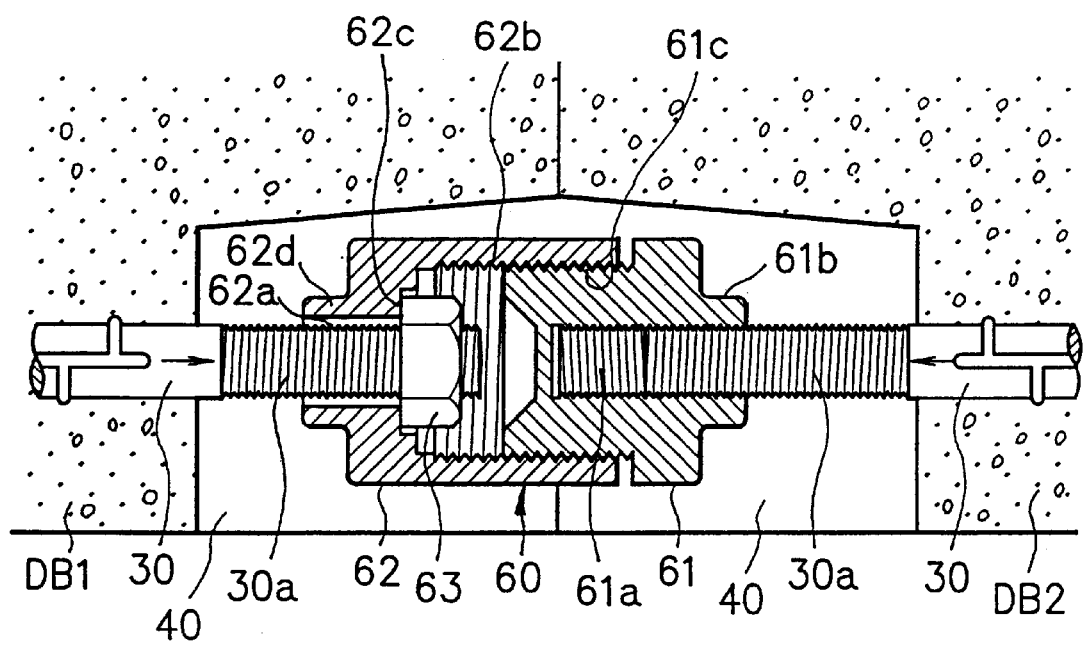
FIG. 12 is a vertical sectional view illustrating another modification of the connector and corresponding to FIG. 3.
Figure 13:
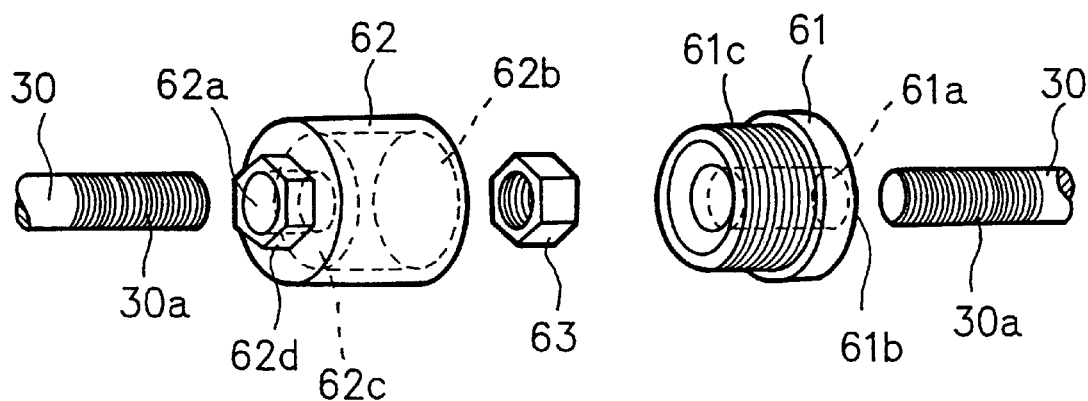
FIG. 13 is an exploded perspective view of the connector shown in FIG. 12.
Figure 14:
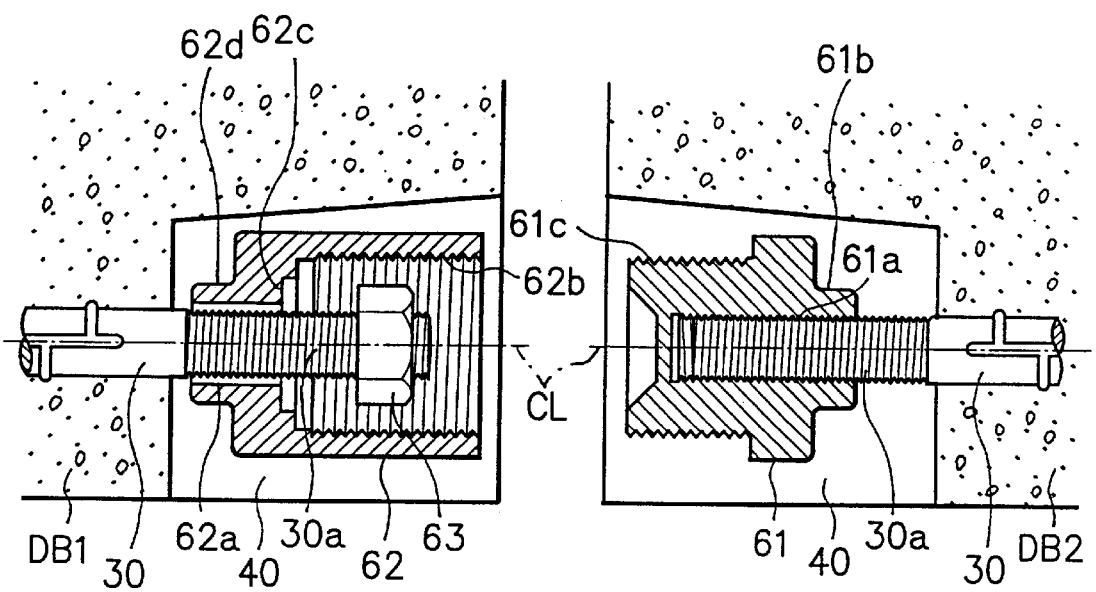
FIG. 14 is a diagram descriptive of a method to connect divided blocks with the connector shown in FIG. 12.

A connector 60 shown in FIGS. 12 through 14 is composed of a first tightening member 61, a second tightening member 62 and a nut 63 which can be fitted over the external thread portion 30a of the connecting rod 30.

The first tightening member 61 has an internal thread hole 61a which is formed at a center thereof so as to correspond to the external thread portion 30a of the connecting rod 30. Further, a nut-like portion 61b engageable with a tool such as a wrench (not shown) is formed on a side of an opening of the internal thread hole 61a of the first tightening member 61. Furthermore, an external thread portion 61c is formed on an outside surface of the first tightening member 61.

The second tightening member 62 has an insertion hole 62a having a diameter slightly larger than an outside diameter of the connecting rod 30 and an internal thread hole 62b corresponding to the external thread portion 61c which are formed by way of a step 62c. Further, a nut-like portion 62d engageable with a tool such as a wrench (not shown) is formed at an end of the second tightening member 62 on a side of the insertion hole 62a.

As seen from the drawings illustrating the connector 60, ridges on the external thread portion 61c of the first tightening member 61 and in the internal thread hole 62b of the second tightening member 62 are right-handed. Further, a ridge on the external thread portion 30a of the connecting rod 30 on a side of the second tightening member 62 is left-handed to prevent the nut 63 from being loosened at a stage of tightening works described later. Needless to say, it is possible to connect blocks as expected even when at least one of the ridges on the external thread portions 30a of the connecting rods 30 is right-handed or when the ridges on the external thread portion 61c of the first tightening member 61 and in the internal thread hole 62b of the second tightening member 62 are left-handed.

In order to connect the two divided blocks DB1 and DB2 with the connector 60, the second tightening member 62 is fitted over an exposed portion of the connecting rod 30 of the divided block DB1 and the nut 63 is fitted to the external thread portion 30a as shown in FIG. 14. Further, the first tightening member 61 is fitted to the external thread portion 30a of the connecting rod 30 of the other divided block DB2 as shown in FIG. 14. Dependently on relationship of an interval between the connecting rods 30 opposed to each other versus sizes of the parts composing the connector 60, this fitting work may be carried out after the divided blocks are combined as described later.

Reference marks traced on the external thread portions 30a so as to indicate set locations of the nut 63 and the first tightening member 61 will facilitate to determine the locations of the nut 63 and the first tightening member 61 to be set on the external thread portions 30a. Further, it is possible to prevent variations of the nut location by preliminarily coating an inside surface of the nut 63 with an adhesive agent or using two thin nuts as the nut 63 and fixing one of the nuts with the other.

Then, connecting surfaces of the two divided blocks DB1 and DB2 are combined with a packing (not shown) interposed so that the cavities 40 are matched with each other, or the centerlines CL of the connecting rods 30 are aligned with each other (see FIG. 14).

Then, the internal thread hole 62b of the second tightening member 62 is tightened lightly over the external thread portion 61c of the first tightening member 61 by turning, with fingertips, the tightening members 61 and 62 fitted on the connecting rods 30 opposed to each other.

Then, the internal thread hole 62b of the second tightening member 62 is tightened over the external thread portion 61c of the first tightening member 61 by turning only the second tightening member 62 while holding the first tightening member 61 in a condition where tools are engaged with the nut-like portion 61b of the first tightening member 61 and the nut-like portion 62d of the second tightening member 62. Since a ridge on the external thread portion 61c of the first tightening member 61 has a pitch which is larger than that of a ridge on the external thread portion 30a of the connecting rod 30, the tightening members can be tightened similarly by turning only the first tightening member 61 while holding the second tightening member 62.

As the tightening work proceed, the nut 63 fitted over the external thread portion 30a of the connecting rod 30 is brought into contact with the step 62c of the second tightening member 62. When the tightening work is continued subsequently, the connecting rods 30 are pulled in directions indicated by arrows in FIG. 12, whereby the divided block DB1 and the divided block DB2 are brought into contact with each other under pressure with no gap by way of the packing.

Since a slight clearance is reserved between the insertion hole 62a of the second tightening member 62 and the connecting rod 30, the clearance absorbs a deviation, if it exists between the centerlines CL of the connecting rods 30 opposed to each other, thereby allowing the connecting work to be carried out correctly.

Further, since the ridges on the external thread portion 61c of the first tightening member 61 and in the internal thread hole 62b of the second tightening member 62 are formed in a direction reverse to that of the ridges on the external thread portions 30a of the connecting rods 30, the nut 63 which is fitted over the external thread portion 30a of the connecting rod 30 cannot be loosened during the tightening work described above. Needless to say, a similar loosening preventive effect can be obtained by preliminarily applying an adhesive agent to an inside surface of the nut 63 to be fitted over the external thread portion 30a or using two thin nuts as the nut 63 and fixing one of the nuts with the other.

The tightening work described above is continued until the divided block DB1 and the divided block DB2 are brought into contact with each other under a predetermined pressure by way of the packing, whereby the two divided blocks DB1 and DB2 are firmly connected to each other.

After completing the tightening work, a hardener material similar to that described above (not shown) is poured into each cavity 40 and is hardened. Accordingly, the hardener material prevents the connector 60 from being loosened and enhances shear strength of connected portions. Now, a series of the connecting works have been completed.

Figure 15:
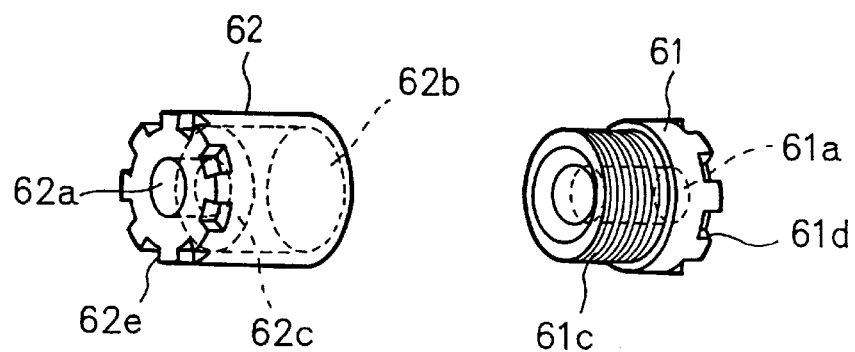
FIG. 15 is a perspective view illustrating a modification of the connector shown in FIG. 12.

Tooth-ring portions (portions at which rectangular grooves are arranged at equal intervals in circumferential directions) 61d and 62e may be formed as shown in FIG. 15 in place of the nut-like portion 61b of the first tightening member 61 and the nut-like portion 62d of the second tightening member 62. In this case, tools which have protrusions or the like engageable with the tooth-ring portions 61d and 62e are used as the tightening tools.

Figure 16:
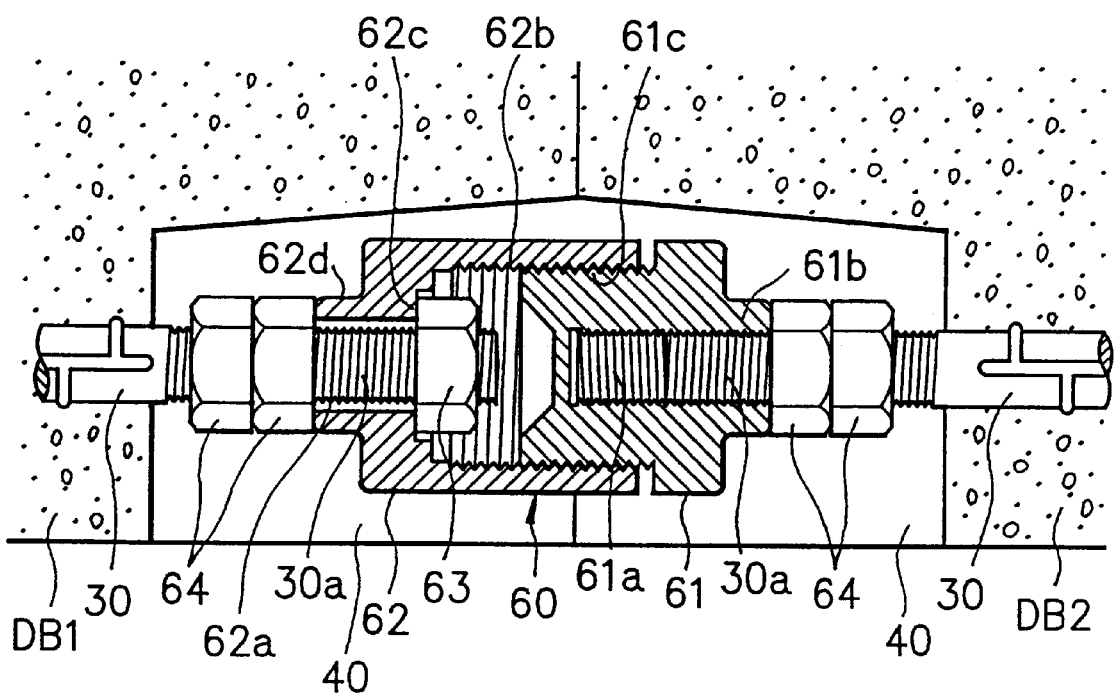
FIG. 16 is a vertical sectional view illustrating the modification of the connector shown in FIG. 12 and corresponding to FIG. 3.

Further, a method illustrated in FIG. 16 can be adopted to maintain favorable connecting strength, watertightness and airtightness by preventing the connecting rods 30 and both the tightening members 61, 62 from being plastically deformed by external forces applied to the block after connection.

The method illustrated in FIG. 16 is configured to preliminarily fit two fixing nuts 64 over the external thread portion 30a of the connecting rod 30, and fix the first tightening member 61 and the second tightening member 62 by tightening the fixing nuts 64 after completing the tightening works for the first tightening member 61 and the second tightening member 62. Needless to say, similar fixing can be performed even with a single fixing nut 64. Though no description is made in particular, a similar effect can be obtained by adopting a method which is similar to that illustrated in FIG. 8 or 9.

Figure 17:
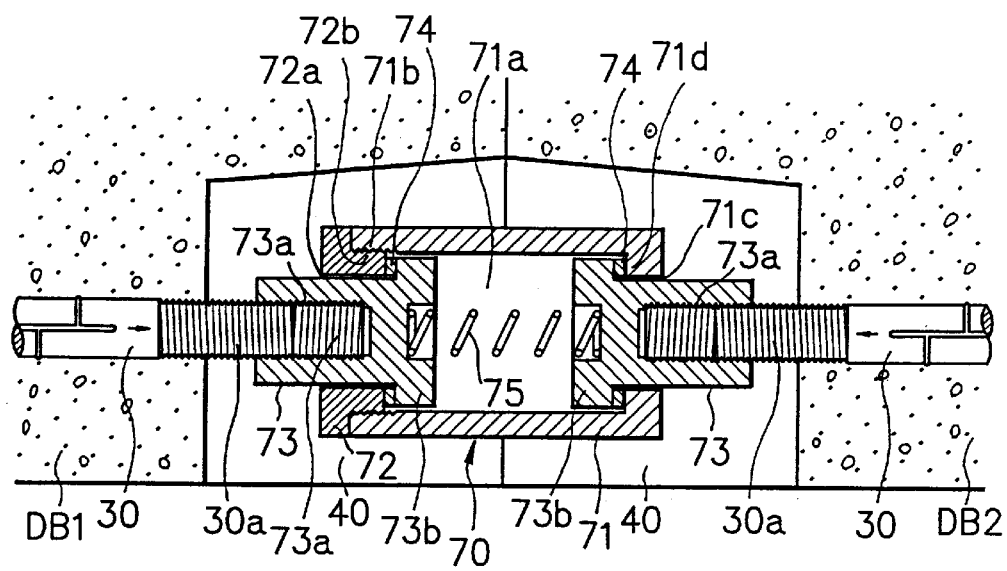
FIG. 17 is a vertical sectional view illustrating another modification of the connector and corresponding to FIG. 3.
Figure 18:
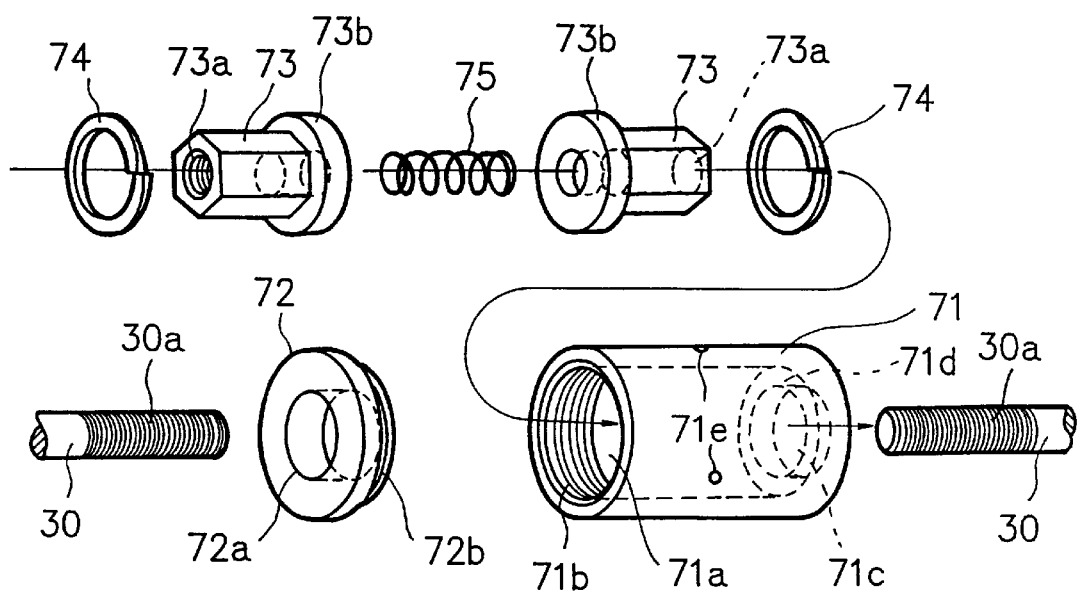
FIG. 18 is an exploded perspective view illustrating the connector shown in FIG. 17.
Figure 19:
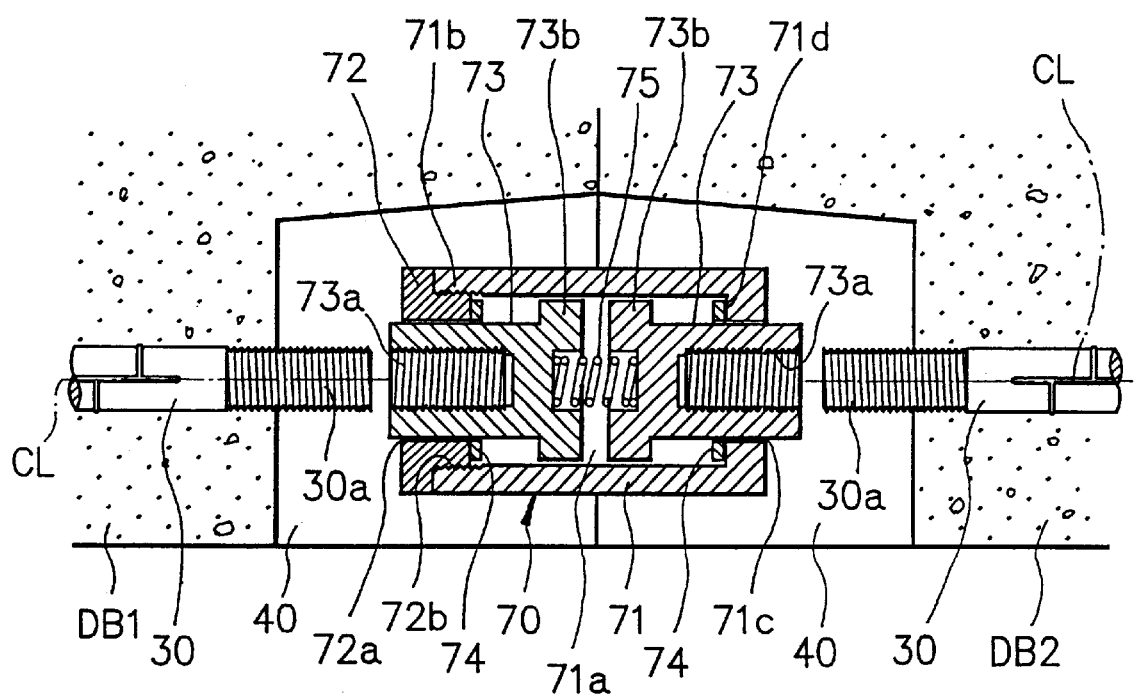
FIG. 19 is a diagram descriptive of a method to connect divided blocks with the connector shown in FIG. 17.

A connector 70 which is illustrated in FIGS. 17 through 19 is composed of a cylindrical guide member 71, a cover member 72 which closes an opening of the guide member 71, two tightening members 73, two spring washers 74 and a coil spring 75.

The guide member 71 has an inner hollow portion 71a which has a circular cross section and an internal thread portion 71b formed on an inside surface of an opening of the inner hollow portion 71a. Further, an insertion hole 71c for the tightening members 73 is formed at an end opposite to the internal thread portion 71b of the guide m ember 71 and a step 71d is formed inside the insertion hole 71c. A reference numeral 71e represents a slot for pouring a hardener material.

The cover member 72 has an insertion hole 72a formed at a center thereof for the tightening members 73 and an external thread portion 72b formed on an outside surface of its end so as to correspond to the internal thread portion 71b.

Each of the tightening members 73 has a form of a hexagonal column which can be inserted into the insertion holes 71c and 72a. An internal thread hole 73a corresponding to the external thread portion 30a of the connecting rod 30 is formed at a center of an end of each tightening member 73. Further, a circular collar 73b which has a diameter smaller than the inner hollow portion 71a is formed on an outside surface of the other end of each tightening member 73.

As seen from the drawings illustrating the connector 70, ridges in the internal thread holes 73a of the tightening members 73 and ridges on the external thread portions 30a of the connecting rods 30 are right-handed. Needless to say, it is possible to perform the block connection as expected by using a left-hand thread on at least one of external thread portions 30a of the connecting rods 30 and modifying the threads in the tightening members 73 accordingly.

The connector 70 is assembled before performing the connecting works. The assembly is carried out by tightening the external thread portion 72b of the cover member 72 into the internal thread portion 71b of the guide member 71 after inserting the spring washer 74, tightening member 73, coil spring 75, tightening member 73 and spring washer 74 in this order into the guide member 71 as shown in FIG. 18.

In order to connect the two divided blocks DB1 and DB2 with the connector 70, the connecting surfaces of the two divided blocks DB1 and DB2 are combined with the packing (not shown) interposed so that the cavities 40 match with each other, or so that the centerlines CL of the connecting rods are aligned with each other as shown in FIG. 19.

Then, the connector 70 is inserted into the cavities 40 while pushing the tightening members 73 of the preliminarily assembled connector 70 into the guide member 71 against an urging force of the coil spring 75. After the insertion, the pushing force is released from the tightening members 73, and the internal thread portions 73a are fitted over the external thread portions 30a of the connecting rods 30 and lightly tightened over the external thread portions 30a by turning the tightening members 73 with fingertips.

Then, the internal thread holes 73a of the tightening members 73 are tightened over the external thread portions 30a of the connecting rods 30 respectively by turning the tightening members 73 in directions reverse to each other with tools engaged with the tightening members 73. Needless to say, this tightening work can be carried out by turning only one of the tightening members 73 while holding the other.

As the tightening work proceeds, the circular collars 73b of the tightening members 73 are brought into contact with the step 71d of the guide member 71 and the end surface of the cover member 72 by way of the spring washers 74. When the tightening works is continued subsequently, the connecting rods 30 are pulled in directions indicated by arrows in FIG. 17, whereby the divided block DB1 and the divided block DB2 are brought into contact with each other under pressure with no gap by way of the packing.

Since slight clearances are reserved between the insertion hole 71c of the guide member 71 and the tightening member 73, and between the insertion hole 72a of the cover member 72 and the tightening member 73, the clearances absorb a deviation, if it exists between the centerlines CL of the connecting rods 30 opposed to each other, thereby allowing the connecting works to be carried out correctly.

When it is fearful that the cover member 72 which is preliminarily tightened into the guide member 71 may be loosened during the tightening work described above, it is preferable to form a ridge on the external thread portion 72*b* of the cover member 72 in a direction reverse to that of the ridges in the internal thread holes 73*a* of the tightening member 73. Needless to say, an adhesive agent may be applied to the external thread portion 72*b* of the cover member 72 before tightening the cover member 72 into the guide member 71.

The tightening work described above is continued until the divided block DB1 and the divided block DB2 are brought into contact with each other under a predetermined pressure by way of the packing, whereby the two divided blocks DB1 and DB2 are firmly connected to each other.

After completing the tightening work, a hardener material similar to that described above (not shown) is poured into the cavities 40 and hardened. The hardener material prevents the connector 70 from being loosened and enhances shear strength of the connected portions. Now, a series of connecting works have been completed.

Figure 20:
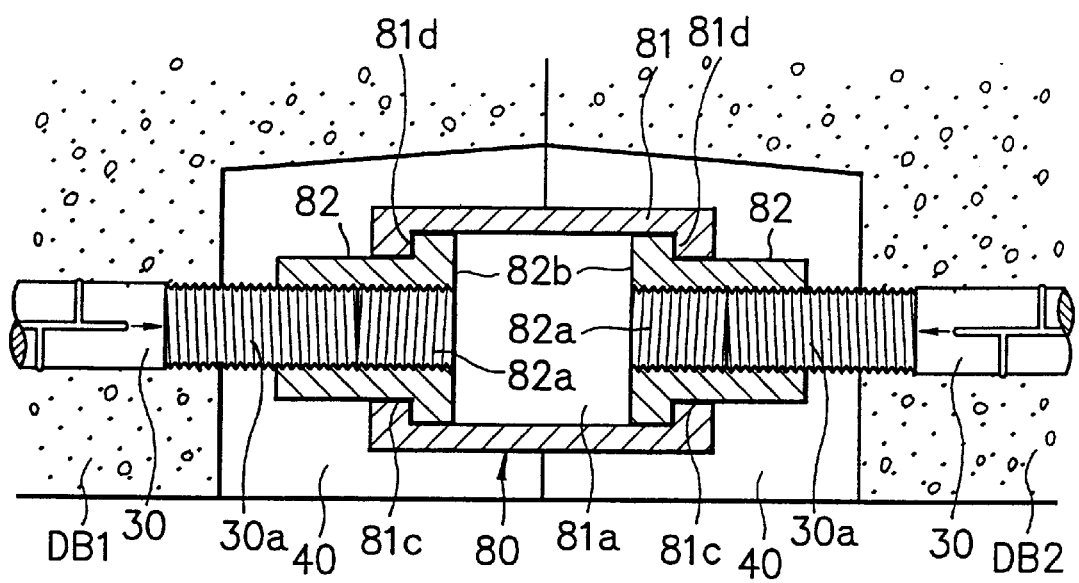
FIG. 20 is a vertical sectional view illustrating another modification of the connector and corresponding to FIG. 3.
Figure 21:
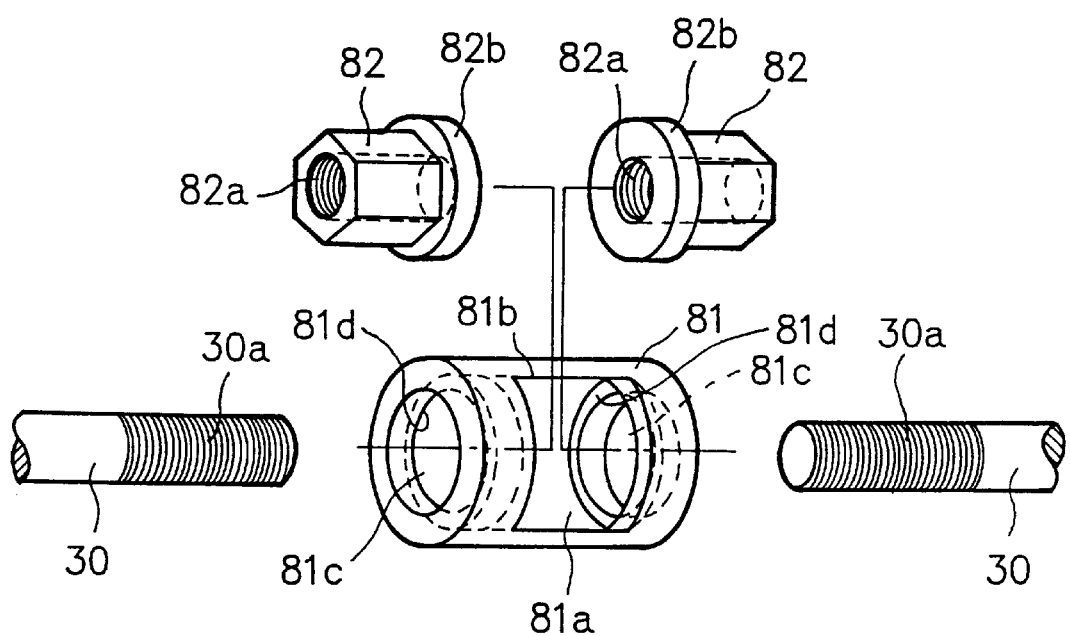
FIG. 21 is an exploded perspective view illustrating the connector shown in FIG. 20.
Figure 22:
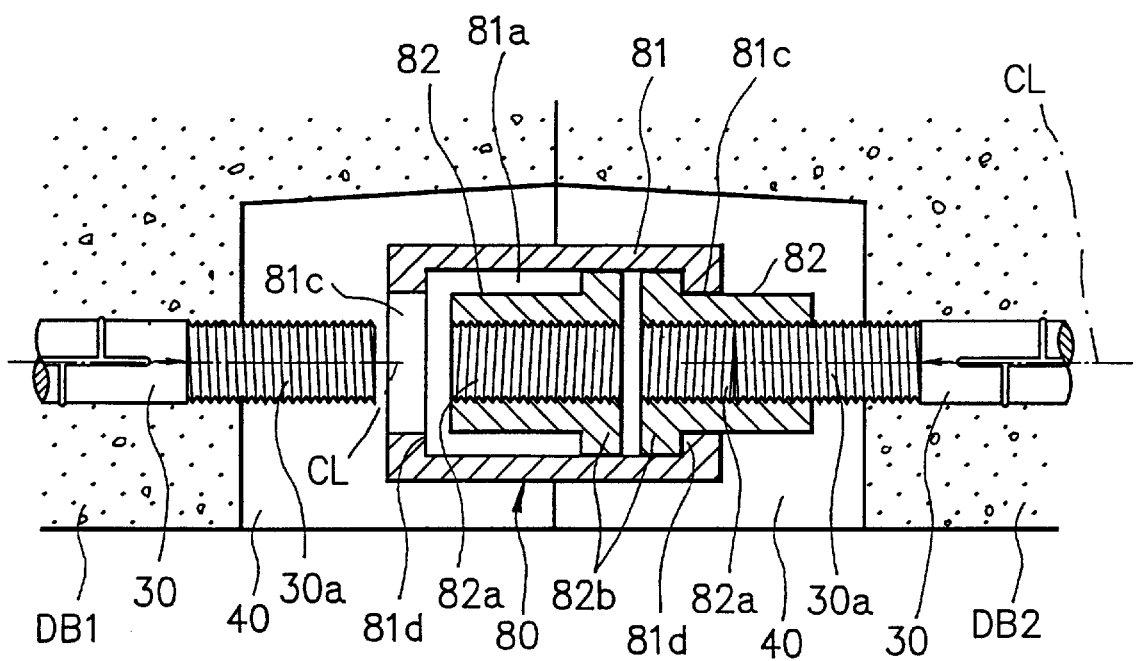
FIG. 22 is a diagram descriptive of a method to connect divided blocks with the connector shown in FIG. 20.

A connector 80 illustrated in FIGS. 20 through 22 is composed of a cylindrical guide member 81 and two tightening members 82.

The guide member 81 has an inner hollow portion 81*a* which has a circular cross section. Further, formed in an outer circumferential surface of the guide member 81 is an insertion port 81*b* for inserting the tightening members 82 into the inner hollow portion 81*a*. Furthermore, insertion holes 81*c* are formed in both end surfaces of the guide member 81 for inserting the tightening members 82 and steps 81*d* are formed inside the insertion holes 81*c*.

Each of the tightening members 82 has a form of a hexagonal column which can be inserted into the insertion holes 81*c*. Formed at a center of an end of each tightening member 82 is an internal thread hole 82*a* which corresponds to the external thread portion 30*a* of the connecting rod 30. Further, a circular collar 82*b* which has a diameter smaller than the inner hollow portion 81*a* is formed on an outside surface of the other end of each tightening member 82.

As seen from the drawings illustrating the connector 80, ridges in the internal thread holes 82*a* of the tightening members 82 and ridges on the external thread portions 30*a* of the connecting rods 30 are right-handed. Needless to say, it is possible to carry out the block connection as expected by using a left-hand thread on at least either of the external thread portions 30*a* of the connecting rods 30 and modifying thread in the tightening member 82 accordingly.

The connector 80 is preliminarily assembled before a connecting work. The assembly is carried out by inserting the two tightening members 82 through the insertion port 81*b* into the guide member 81.

In order to connect the two divided blocks DB1 and DB2 with the connector 80, connecting surfaces of the two divided blocks DB1 and DB2 are combined with a packing (not shown) interposed so that the cavities 40 match with each other, or so that the centerlines CL of the connecting rods 30 are aligned with each other as shown in FIG. 22.

Then, the connector 80 is inserted into the cavities 40 in a condition where either or both of the tightening members 82 of the assembled connector 80 is or are pushed into the guide member 81. After the insertion, each tightening member 82 is pulled out through the insertion hole 81*c*, each internal thread hole 82*a* is fitted over the external thread portion 30*a* of the connecting rod 30 and each tightening member 82 is lightly tightened over the external thread portion 30*a* by turning the tightening member with fingertips.

Then, the internal thread holes 82*a* of the tightening members 82 are tightened over the external thread portions 30*a* of the connecting rod 30 by turning the tightening members 82 in directions reverse to each other in a condition where a tool is engaged with each tightening member 82. Needless to say, this tightening work can be carried out by turning only one of the tightening members 82 while holding the other.

As the tightening work proceeds, the circular collars 82*b* of the tightening members 82 are brought into contact with the steps 81*d* of the guide member 81. When the tightening work is further continued, the connecting rods 30 are pulled in directions indicated by arrows in FIG. 20, whereby the divided block DB1 and the divided block DB2 are brought into contact with each other under pressure with no gap by way of the packing.

Since slight clearances are reserved between the insertion hole 81*c* of the guide member 81 and the tightening member 82, the clearances absorb a deviation, if it exists between the centerlines CL of the connecting rods 30 opposed to each other, thereby allowing the connecting works to be carried out correctly.

The tightening work described above is continued until the divided block DB1 and the divided block DB2 are brought into contact with each other under a predetermined pressure by way of the packing, whereby the two divided blocks DB1 and DB2 are firmly connected to each other.

After completing the tightening work, a hardener material similar to that described above (not shown) is poured into each cavity 40 and is hardened. This hardener material prevents the connector 80 from being loosened and enhances shear strength of connected portions. Now, a series of connecting works have been completed.

Figure 23:
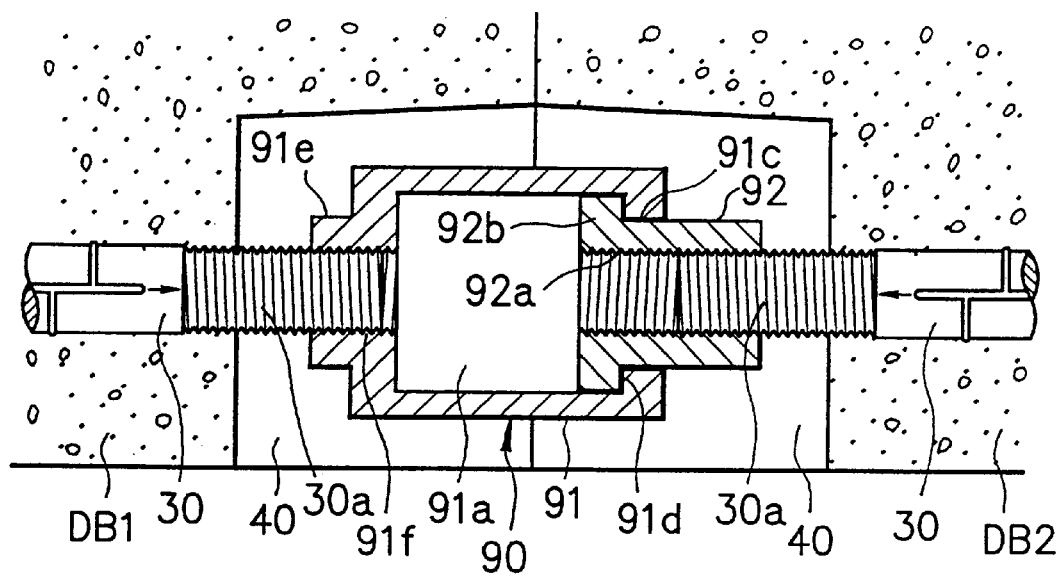
FIG. 23 is a vertical sectional view illustrating still another modification of the connector and corresponding to FIG. 3.
Figure 24:
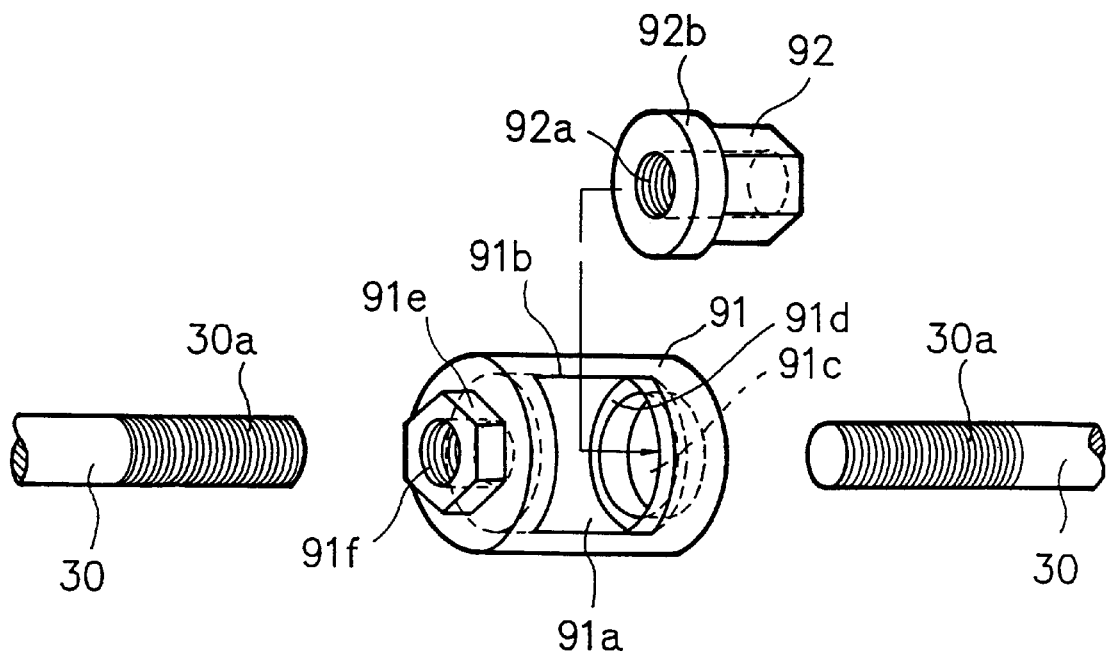
FIG. 24 is an exploded perspective view of the connector shown in FIG. 23.
Figure 25:
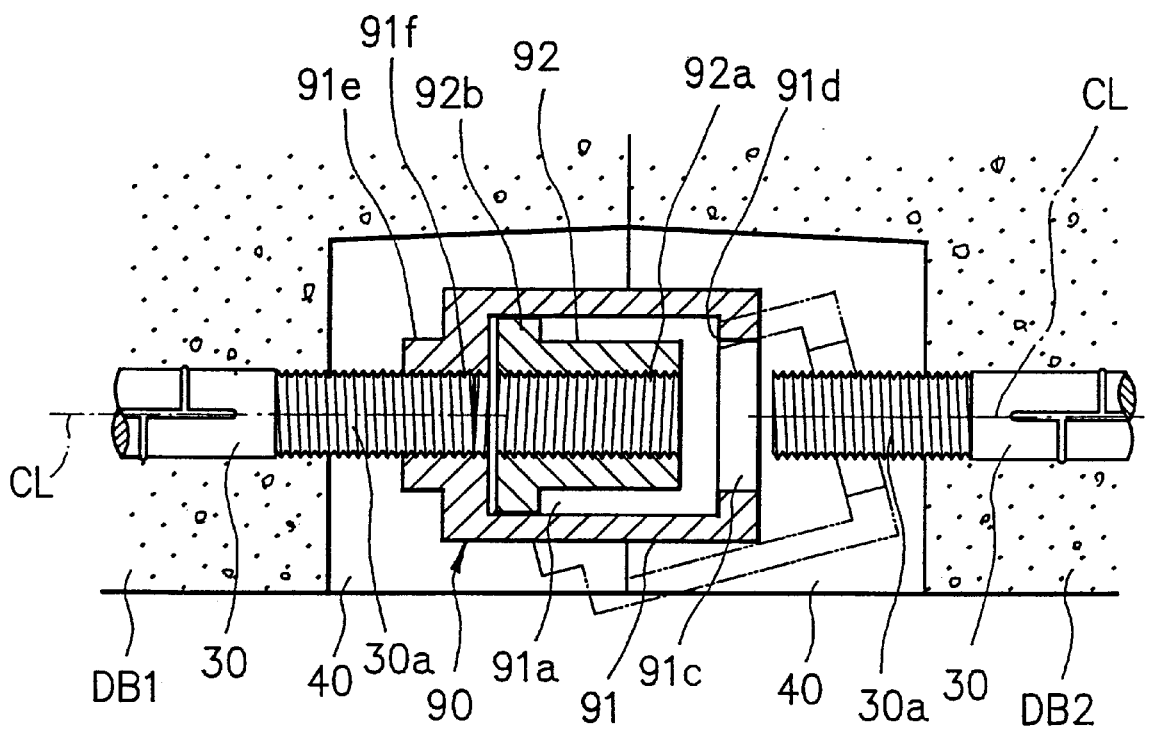
FIG. 25 is a diagram descriptive of a method to connect divided blocks with the connector shown in FIG. 23.

A connector 90 shown in FIGS. 23 through 25 is composed of a cylindrical guide member 91 and a tightening member 92.

The guide member 91 has an inner hollow portion 91*a* which has a circular cross section. Further, an insertion port 91*b* is formed in an outer circumferential surface of the guide member 91 for inserting the tightening member 92 into the inner hollow portion 91*a*. Furthermore, an insertion hole 91*c* is formed in an end surface of the guide member 91 for inserting the tightening member 92 and a step 91*d* is formed inside the insertion hole 91*c*. Moreover, a nut-like portion 91*e* engageable with a tool such as a wrench (not shown) is formed on an end surface of the guide member 91 and an internal thread hole 91*f* corresponding to the external thread portion 30*a* of the connecting rod 30 is formed at a center of the nut-like portion 91*e*.

The tightening member 92 has a form of a hexagonal column which can be inserted into the insertion hole 91*c*. An internal thread hole 92*a* corresponding to the external thread portion 30*a* of the connecting rod 30 is formed at a center of the tightening member 92. Further, a circular collar 92*b* having a diameter smaller than the inner hollow portion 91*a* is formed on an outside surface of the other end of the tightening member 92.

As seen from the drawings illustrating the connector 90, ridges in the internal thread hole 91*f* of the guide member 91 and the internal thread hole 92*a* of the tightening member 92 are right-handed, and ridges on the external thread portions 30*a* of the connecting rods 30 are also right-handed. Needless to say, it is possible to perform the block connection as expected even when a left-hand thread is selected for at least one of the external thread portions 30*a* of the connecting rods 30, and the ridges in the guide member 91 and the tightening member 92 are modified accordingly.

The connector 90 is assembled before carrying out the connecting works. The assembly is carried out by inserting the tightening member 92 into the guide member 91 through the insertion hole 91b as shown in FIG. 24.

In order to connect the two divided blocks DB1 and DB2 with the connector 90, connecting surfaces of the two divided blocks DB1 and DB2 are combined with the packing (not shown) interposed so that the cavities 40 match with each other, or so that the centerlines CL of the connecting rods 30 are aligned with each other.

Then, the connector 90 is inserted into the cavities 40 in a condition where the tightening member 92 of the preliminarily assembled connector 90 is pushed into the guide member 91. When the guide member 91 has a length which is longer than an interval between the connecting rods 30 opposed to each other, it is preferable to incline the guide member 91 as indicated by two-dot chain lines in FIG. 25 at this insertion stage so that one of the connecting rod 30 is inserted into the insertion hole 91c. After the insertion, the internal thread hole 91f of the guide member 91 is fitted over the external thread portion 30a of one of the connecting rods 30, the tightening member 92. is pulled out through the insertion hole 91c, the internal thread hole 92a is fitted over the external thread portion 30a of the other connecting rod 30, and the guide member 91 and the tightening member 92 are lightly tightened over the external thread portions 30a by turning the members with fingertips.

Then, the internal thread hole 91f of the guide member 91 is tightened over the external thread portion 30a of one of the connecting rods 30 and the internal thread hole 92a of the tightening member 92 is tightened over the external thread portion 30a of the other connecting rod 30 by turning the guide member 91 and the tightening member 92 in directions reverse to each other in a condition where tools are engaged with the nut-like portion 91e of the guide member 91 and the tightening member 92 respectively. Needless to say, this tightening work may be carried out by turning only one of the guide member 91 and the tightening member 92 while holding the other.

As the tightening work proceeds, the circular collar 92b of the tightening member 92 is brought into contact with the step 91d of the guide member 91. When the tightening work is continued further, the connecting rods 30 are pulled in directions indicated by arrows in FIG. 23, whereby the divided block DB1 and the divided block DB2 are brought into contact with each other under pressure with no gap by way of the packing.

A slight clearance is reserved between the insertion hole 91c of the guide member 91 and the tightening member 92 so that the clearance absorbs a deviation which may exist between the centerlines CL of the connecting rods 30 opposed to each other, thereby allowing the connecting works to be carried out correctly.

The tightening work described above is continued until the divided block DB1 and the divided block DB2 are brought into contact with each other under a predetermined pressure by way of the packing, whereby the two divided blocks DB1 and DB2 are firmly connected to each other.

After completing the tightening work, a hardener material similar to that described above (not shown) is poured into the cavities 40 and hardened. The hardener material prevents the connector 90 from being loosened and enhances shear strength of connected portions. Now, a series of connecting works have been completed.

Figure 26:
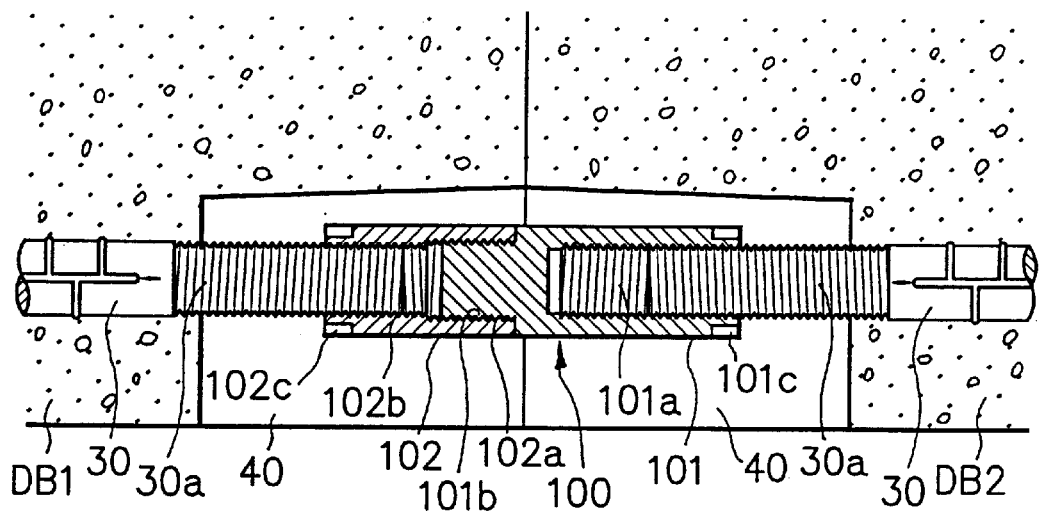
FIG. 26 is a vertical sectional view illustrating further another modification of the connector and corresponding to FIG. 3.
Figure 27:
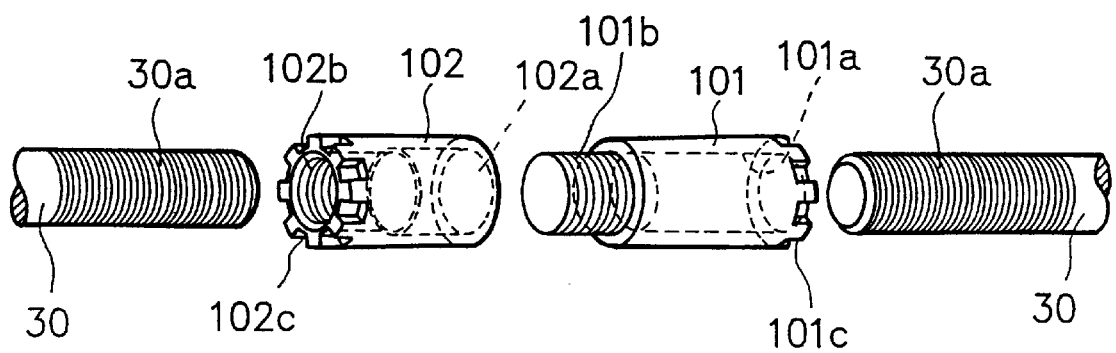
FIG. 27 is an exploded perspective view of the connector shown in FIG. 26.

A connector 100 shown in FIGS. 26 through 28 is composed of a first tightening member 101 and a second tightening member 102.

An internal thread hole 101a corresponding to the external thread portion 30a of the connecting rod 30 is formed at a center of an end surface of the first tightening member 101 and an external thread portion 101b is formed at the other end. Further, a tooth-ring portion 101c at which rectangular grooves are arranged at equal intervals in a circumferential direction is formed on an end surface of the first tightening member 101.

An internal thread hole 102a corresponding to the external thread portion 101b of the first tightening member 101 is formed at a center of an end surface of the second tightening member 102 and an internal thread hole 101b corresponding to the external thread portion 30a of the connecting rod 30 is formed at a center of the other end surface. Further, a tooth-ring portion 101c at which rectangular grooves are arranged at equal intervals in a circumferential direction is formed on the other end surface of the second tightening member 102.

As seen from the drawings illustrating the connector 100, the internal thread hole 101a and the external thread portion 101b of the first tightening member 101 as well as the internal thread hole 101a of the second tightening member 102 have right-hand threads, and the external thread portion 30a of the connecting rod 30 on a side of the first tightening member 101 also has a right-hand thread. Further, the internal thread hole 101b of the second tightening member 102 has a left-hand thread and the external thread portion 30a of the connecting rod 30 on a side of the second tightening member 102 also has a left-hand thread. Needless to say, it is possible to carry out the block connection as expected even when the internal thread hole 101a and the external thread portion 101b of the first tightening member 101 as well as the internal thread hole 101a of the second tightening member 102 use left-hand threads, the external thread portion 30a of the connecting rod 30 on the side of the first tightening member 101 has a left-hand thread, while the internal thread hole 101b of the second tightening member 102 has a right-hand thread and the external thread portion 30a of the connecting rod 30 on the side of the second tightening member 102 has a right-hand thread.

In order to connect the two divided blocks DB1 and DB2 with the connector 100, the second tightening member 102 is fitted over the external thread portion 30a of the connecting rod 30 of the divided block DB1 by utilizing the internal thread hole 101b as shown in FIG. 28. Further, the first tightening member 101 is fitted over the external thread portion 30a of the connecting rod 30 of the other divided block DB2 by utilizing the internal thread hole 101a as shown in FIG. 28. These connecting works may be carried out after combining the divided blocks as described later dependently on relationship of an interval between the connecting rods 30 opposed to each other versus sizes of the parts composing the connector 100.

Then, the connecting surfaces of the two divided blocks DB1 and DB2 are combined with the packing (not shown) interposed so that the cavities 40 match with each other, or the centerlines CL of the connecting rods 30 (see FIG. 28) are aligned with each other.

Then, the external thread portion 101b of the first tightening member 101 is lightly tightened into the internal thread hole 101a of the second tightening member 102 by turning the tightening members 101 and 102, which are fitted on the connecting rods 30 opposed each other, with fingertips.

Then, in a condition where tools are engaged with the toothring portion 101c of the first tightening member 101 and the tooth-ring portion 101c of the second tightening member 102, the external thread portion 101b of the first tightening member 101 is tightened into the internal thread hole 101*a* of the second tightening member 102 by turning the first tightening member 101 with the tool. This tightening work is continued until the first tightening member 101 is connected to the second tightening member 102 with no gap.

After the connection, the internal thread hole 101*a* of the first tightening member 101 is tightened over the external thread portion 30*a* of the connecting rod 30 and the internal thread hole 101*b* of the second tightening member 102 is tightened over the external thread portion 30*a* of the connecting rod 30 by turning the first tightening member 101 and the second tightening member 102 in the same direction with tools. By this tightening, the connecting rods 30 are pulled in directions indicated by arrows in FIG. 26, whereby the divided block DB1 and the divided block DB2 are brought into contact with each other under pressure with no gap by way of the packing.

The tightening work described above is continued until the divided block DB1 and the divided block DB2 are brought into contact with each other under a predetermined pressure by way of the packing, whereby the two divided blocks are firmly connected to each other.

After completing the tightening work, a hardener material similar to that described above (not shown) is poured into the cavities 40 and hardened. The hardener material prevents the connector 100 from being loosened and enhances shear strength of the connected parts. Now, a series of connecting works have been completed.

Now, examples of block connecting structures for concrete blocks other than the beam blocks shown in FIG. 1 will be described with reference to FIGS. 29 through 33. Cavities for accommodating connectors are represented by a reference numeral 40.

Figure 29:
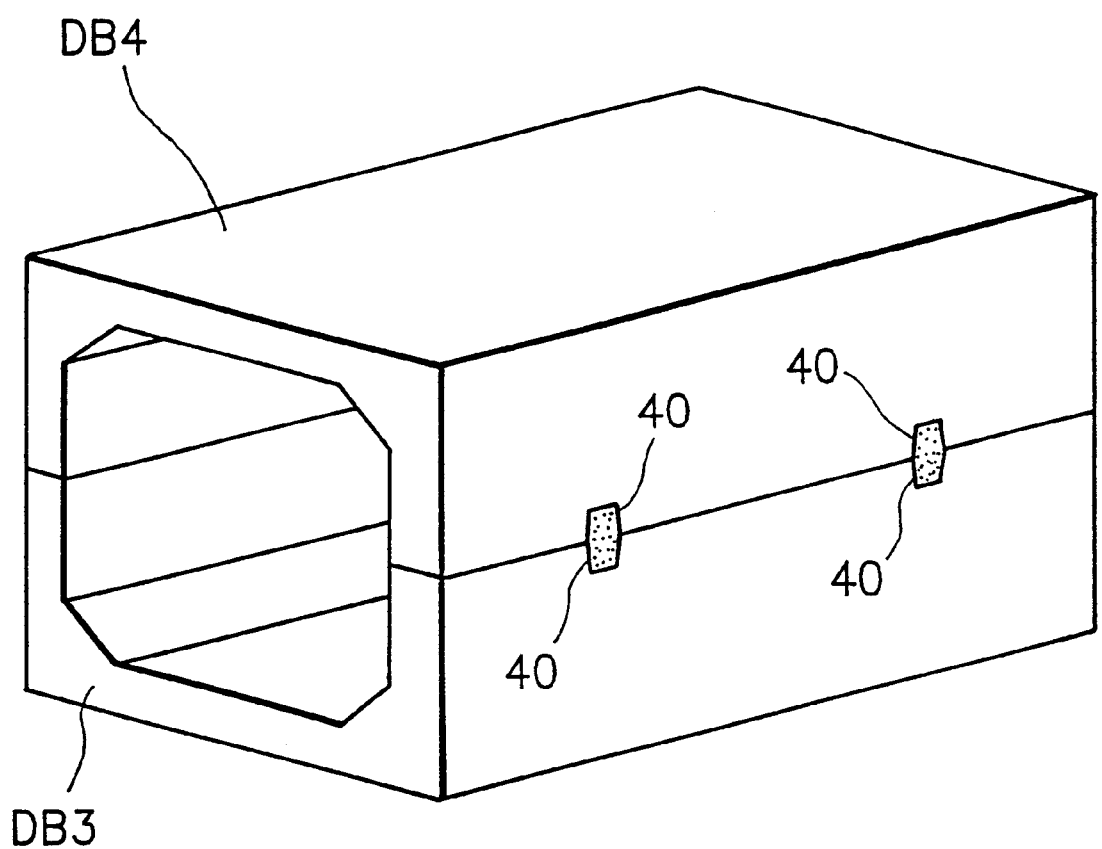
FIG. 29 is a perspective view illustrating another embodiment of the connecting structure for concrete block.

FIG. 29 shows an example wherein the present invention is applied to a covered conduit block (a culvert block). This covered conduit block is composed of two lower and upper divided blocks DB3 and DB4 which are combined by way of a packing (not shown) and integrated by connecting them with connectors (not shown). Each of the divided blocks DB3 and DB4 comprises an internal reinforcement (not shown) which is assembled into a form similar to that of the divided blocks. Two cavities 40 are formed at an interval in an outside surface of a connecting end of each of the divided blocks DB3 and DB4. Connecting rods (not shown) are buried in the divided blocks DB3 and DB4 in conditions where they are joined or not joined to the internal reinforcements and external thread portions of the connecting rods are exposed in the cavities 40. Any one type of the connectors which have been described above is selectively utilized to connect these divided blocks DB3 and DB4. The divided blocks are connected by the method which has been described above.

Figure 30:
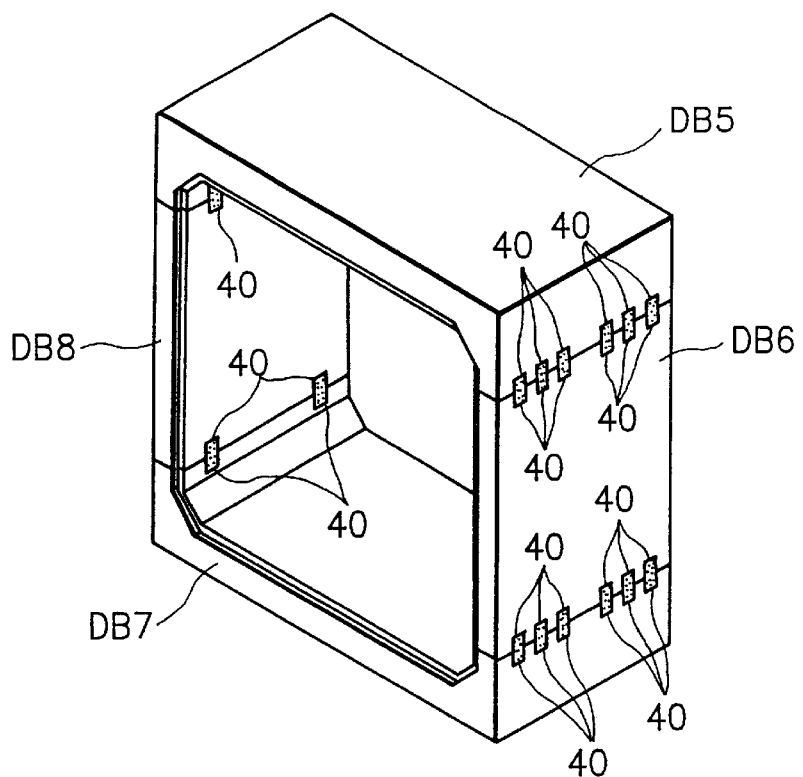
FIG. 30 is a perspective view illustrating still another embodiment of the connecting structure for concrete block.

FIG. 30 exemplifies application of the present invention to a covered conduit block (a culvert block). This covered conduit block is composed of four divided blocks DB5 through DB8 which are preliminarily manufactured in divided forms, combined into a rectangular form by way of packings (not shown) and integrated by connecting them with connectors (not shown). Each of the divided blocks DB5 through DB8 comprises an internal reinforcement (not shown) which is assembled into a form similar to that of the divided block. Six cavities 40 are formed at intervals in an outside surface of a connecting end of each of the divided blocks DB5 through DB8 and two cavities 40 are formed at an interval in an inside surface. In other words, the number of the cavities 40 (the number of connectors) is larger on a side where a tensile force is exerted in the covered conduit after construction than that on the other side where a compressive force is exerted so as to enhance tensile strength. Connecting rods (not shown) are buried in the divided blocks DB5 through DB8 in a condition where they are joined or not joined to the internal reinforcements and external thread portions of the connecting rods are exposed in the cavities 40. Any one type of connectors which have been described above are selectively utilized to connect the divided blocks DB5 through DB8. The divided blocks are connected by the method which has been described above.

Figure 31:
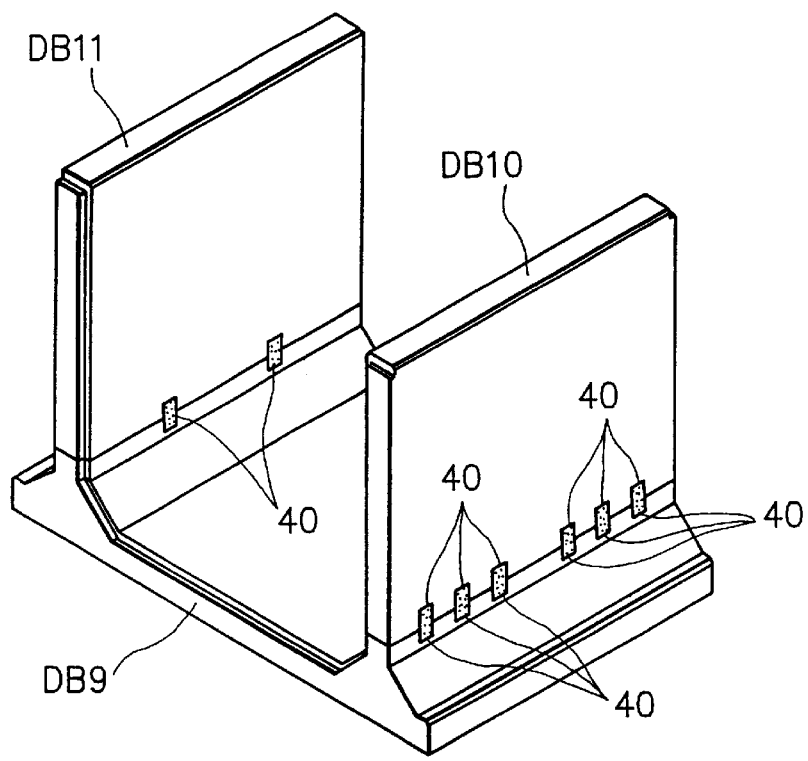
FIG. 31 is a perspective view illustrating further another embodiment of the connecting structure for concrete block.

FIG. 31 shows an example wherein the present invention is applied to an aqueduct block. This aqueduct block is composed of three divided blocks DB9 through DB11 which are preliminarily manufactured in divided forms, combined into a U form by way of packings (not shown) and integrated by connecting them with connectors (not shown). Each of the divided blocks DB9 through DB11 comprises an internal reinforcement (not shown) which is assembled into a form similar to that of the divided block. Six cavities 40 are formed at intervals in an outside surface of a connecting end of each of the divided blocks DB9 through DB11 and two cavities 40 are formed at an interval in an inside surface. In other words, the number of the cavities 40 (the number of the connectors) is larger on a side where a tensile force is exerted in the aqueduct block after construction than on a side where a compressive force is exerted so as to enhance tensile strength. The connecting rods (not shown) are buried in the divided blocks DB9 through DB11 in a condition where they are joined or not joined to the internal reinforcements and external thread portions of the connecting rods are exposed in the cavities 40. Any one type of the connectors described above are selectively utilized to connect the divided blocks DB9 through DB11. The method which has been described above is used to connect the divided blocks.

Figure 32:
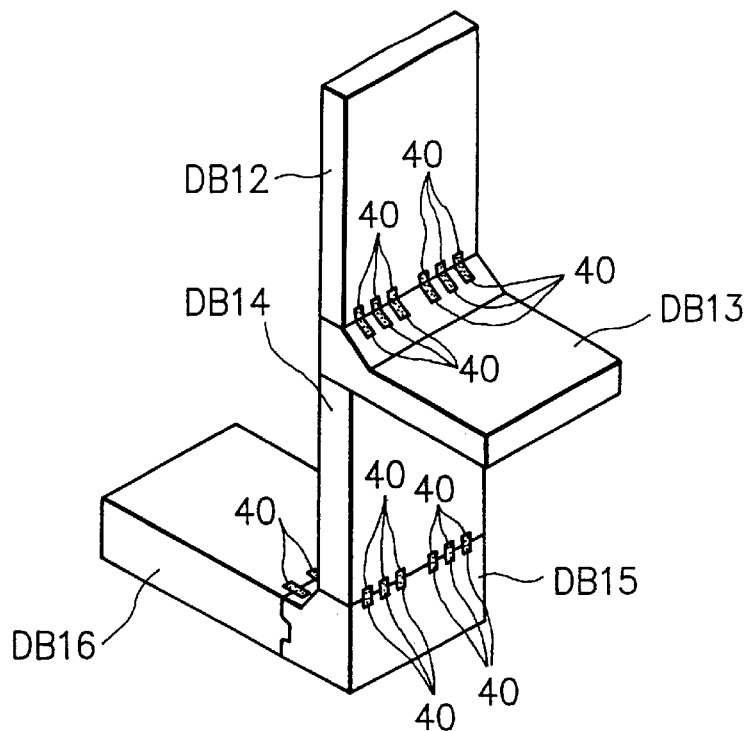
FIG. 32 is a perspective view illustrating further another embodiment of the connecting structure for concrete block.

FIG. 32 shows an example wherein the present invention is applied to a retaining wall block. This retaining wall block is composed of five divided blocks DB12 through DB16 which are preliminarily manufactured in divided forms, combined into a substantially L form by way of packings (not shown) and integrated by connecting them with connectors (not shown). Each of the divided blocks DB12 through DB16 comprises an internal reinforcement (not shown) which is assembled into a form similar to that of the divided block. Six cavities 40 are formed at intervals in an outside surface of a connecting end of each of the divided blocks DB12 through DB16 and four cavities 40 are formed at intervals in each inside surface. In other words, the number of the cavities 40 (the number of connectors) is made larger on a side where a tensile force is exerted in a retaining wall block after construction than that on a side where a compressive force is exerted so as to enhance tensile strength. Connecting rods (not shown) are buried in each of the divided blocks DB12 through DB16 in a condition where they are joined or not joined to the internal reinforcement and external thread portions of the connecting rods are exposed in the cavities 40. Any one type of connectors which have been described above are selectively utilized to connect these divided blocks DB12 through DB16. The method which has been described above is used to connect the divided blocks.

Figure 33:
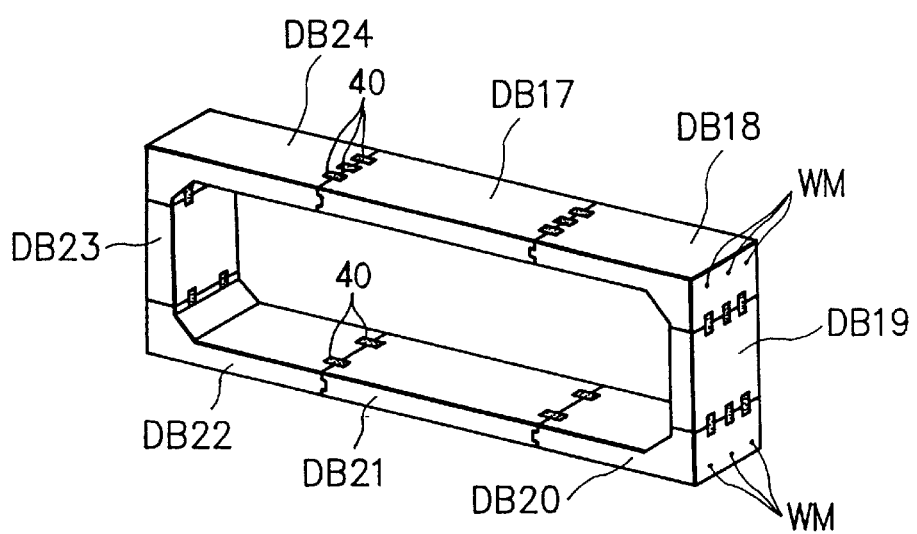
FIG. 33 is a perspective view illustrating further another embodiment of the connecting structure for concrete block.

FIG. 33 shows an example wherein the present invention is applied to a covered conduit block (a culvert block). This covered conduit block is composed of eight divided blocks DB17 through DB24 which are preliminarily manufactured in divided forms, combined into a rectangular form by way of packings (not shown) and integrated by connecting them with connectors (not shown). Each of the divided blocks DB17 through DB24 comprises an internal reinforcement (not shown) which is assembled into a form similar to that of the divided blocks. Three cavities 40 are formed at intervals in an outside surface of a connecting end of each of the divided blocks DB17 through DB24 and two cavities 40 are formed at an interval in each inside surface. In other words, the number of the cavities 40 (the number of connectors) is made larger on a side where a tensile force is exerted in the covered conduit block after construction than that on a side where a compressive force is exerted so as to enhance tensile strength. Connecting rods (not shown) are buried in each of the divided blocks DB17 through DB24 in a condition where they are joined or not joined to the internal reinforcement and external thread portions of the connecting rods are exposed in the cavities 40. Any one type of connectors which have been described above are selectively utilized to connect these divided blocks DB17 through DB24. Adopted to connect the divided blocks is a prestress method which is fundamentally the same as those which have been described above.

The prestress method is adopted mainly for cancelling stresses produced by a load. In the block shown in FIG. 33, tensile strength is enhanced by preliminarily exerting compressive forces to inner side portions of the upper connected blocks (DB24, DB17 and DB18) and the lower connected blocks (DB22, DB21 and DB20) wherein tensile forces are exerted. To preliminarily exert compressive forces, a wire or a cable (hereinafter referred to as straining material WM) which is made of a steel material having high strength or the like is passed through cylindrical parts called sheaths which are preliminarily buried in the upper divided blocks (DB24, DB17 and DB18) and the lower divided blocks (DB22, DB21 and DB20) respectively. After passing the straining material WM, compressive forces are exerted to the inner side portions of the upper connected blocks and the lower connected blocks respectively by pulling and fixing both ends of the straining material WM with implements which have nuts and tapers.

Now, divided block connecting methods which can be utilized for building concrete structures will be described with reference to FIGS. 34 through 43. In these drawings, a main bar of an internal reinforcement is represented by a reference numeral 11 and a connecting rod is designated by a reference numeral 30. Further, the connector 50 shown in FIG. 3 is used for connecting divided blocks.

Figures 34A, 34B:
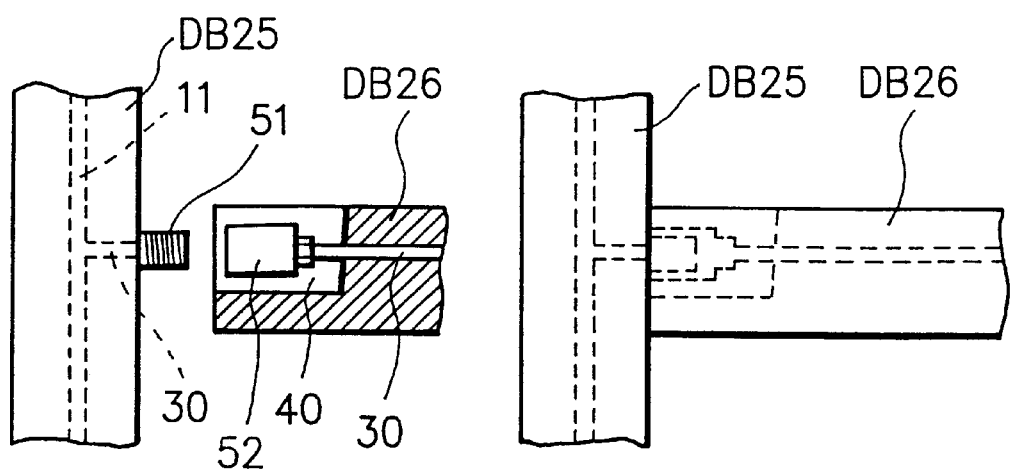
FIGS. 34(A) and 34(B) are diagrams descriptive of a block connecting method which can be utilized for building concrete structures.

FIGS. 34(A) and 34(B) show a method to connect divided blocks into a T shape. A connecting rod 30 is joined to a planar-plate like divided block DB25 by welding or another technique so that it is perpendicular to a main bar 11 of an internal reinforcement and an external thread portion of the connecting rod is exposed on a surface. A connecting rod 30 is buried in a planar-plate like divided block DB26 so that an external thread portion of the connecting rod is exposed in a cavity 40. To connect these divided blocks DB25 and DB26 to each other, a first tightening member 51 and a second tightening member 52 are fitted over the external thread portions respectively. After the divided blocks DB25 and DB26 are combined as shown in FIG. 34(B), the first tightening member 51 and the second tightening member 52 are tightened.

Figures 35A, 35B:
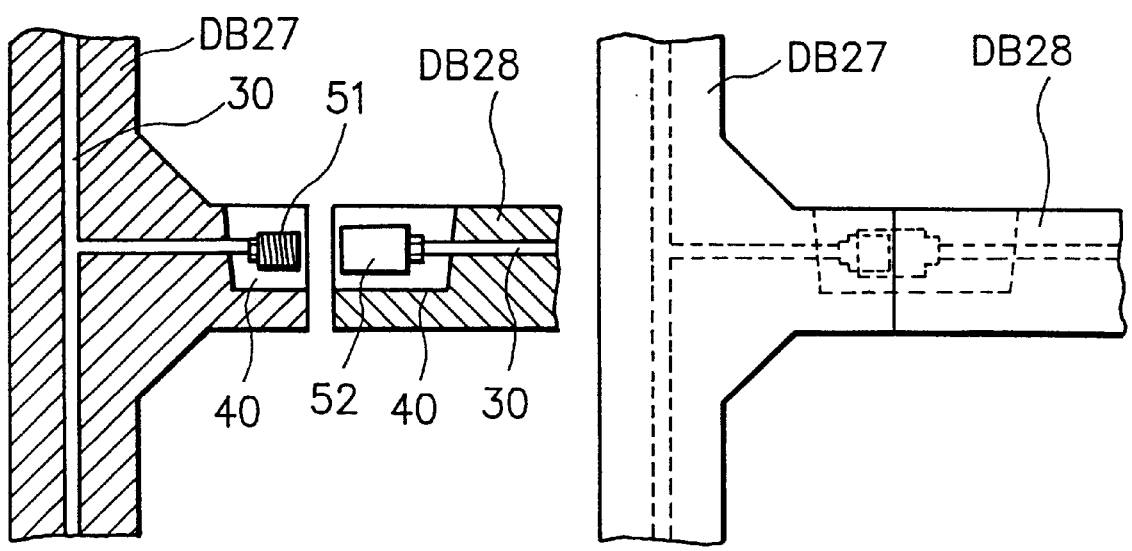
FIGS. 35(A) and 35(B) are diagrams descriptive of a block connecting method which can be utilized for building concrete structures.

FIGS. 35(A) and 35(B) show a method to connect divided blocks into a T shape. A T-shaped connecting rod 30 is buried in a T-shaped divided block DB27, with an external thread portion of the connecting rod exposed in a cavity 40. A connecting rod 30 is buried in a planar-plate like divided block DB28, with an external thread portion of the connecting rod exposed in a cavity 40. To connect these divided blocks DB27 and DB28, a first tightening member 51 and a second tightening block 52 are fitted over the external thread portions respectively. After the divided blocks DB27 and DB28 are combined as shown in FIG. 35(B), the first tightening member 51 and the second tightening member 52 are tightened.

Figure 36:
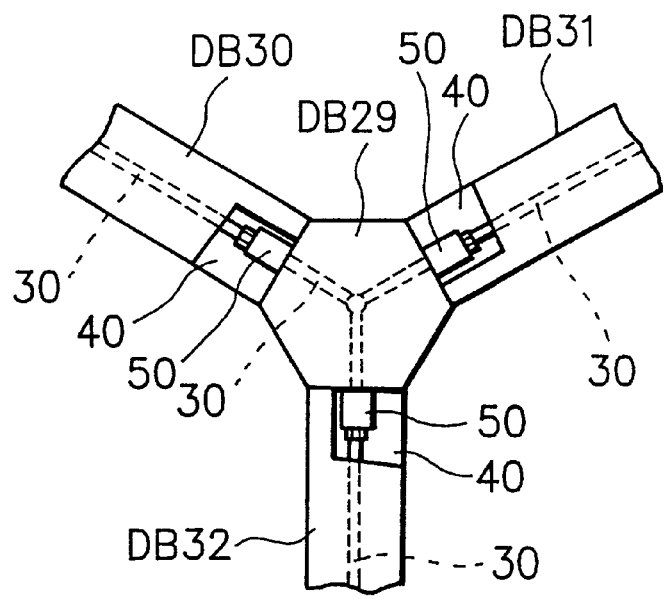
FIG. 36 is a diagram descriptive of a block connecting method which can be utilized for building concrete structures.

FIG. 36 shows a method to connect divided blocks into a radial shape. An Y-shaped connecting rod 30 is buried in a divided block DB29 which has a column shape and three external thread portions of the connecting rod are exposed to a surface. Connecting rods 30 are buried in planar-plate like divided blocks DB30 through DB32, with external thread portions of the connecting rods exposed in cavities 40. To connect these divided blocks DB29 through DB32 to one another, first tightening members and second tightening members of connectors 50 are fitted over the external thread portions respectively. After combining the divided blocks DB29 through DB32 as shown in the drawing, the first tightening members and the second tightening members are tightened.

Figure 37:
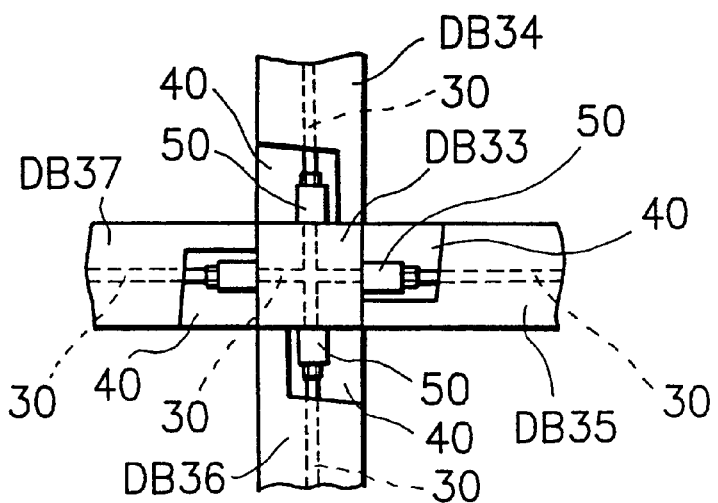
FIG. 37 is a diagram descriptive of a block connecting method which can be utilized for building concrete structures.

FIG. 37 shows a method to connect divided blocks into a cross shape. A cross-shaped connecting rod 30 is buried in a divided block DB33 which has a square prism shape, with four external thread portions of the connecting rods exposed to surfaces. Connecting rods 30 are buried in planar-plate like divided blocks DB34 through DB37, with external thread portions of the connecting rods exposed in cavities 40. To connect these divided blocks DB33 through DB37, first tightening members and second tightening members of connectors are fitted over the external thread portions respectively. After the divided blocks DB33 through DB37 are combined as shown in the drawing, the first tightening members and the second tightening members are tightened.

Figure 38:
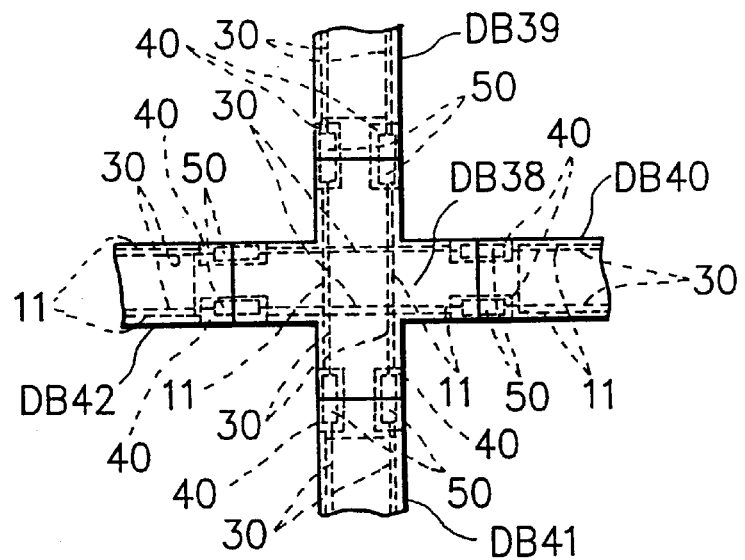
FIG. 38 is a diagram descriptive of a block connecting method which can be utilized for building concrete structures.

FIG. 38 shows a method to connect divided blocks into a cross shape. In a cross-shaped divided block DB38, main bars 11 of an internal reinforcement are buried in parallel with a surface of the divided block and connecting rods 30 are buried in parallel with the main bars 11, with external thread portions formed at both ends of each connecting rod 30 exposed in cavities 40. In planar-plate like divided blocks DB39 through DB42, main bars 11 of internal reinforcements are buried in parallel and connecting rods 30 are buried in parallel with the main bars 11, with external thread portions formed at both ends of each connecting rod 30 exposed in cavities 40. To connect these divided blocks DB38 through DB42 to one another, first tightening members and second tightening members of connectors 50 are fitted over the external thread portions respectively. After the divided blocks DB38 through DB42 are combined as shown in the drawing, the first tightening members and the second tightening members are tightened.

Figure 39:
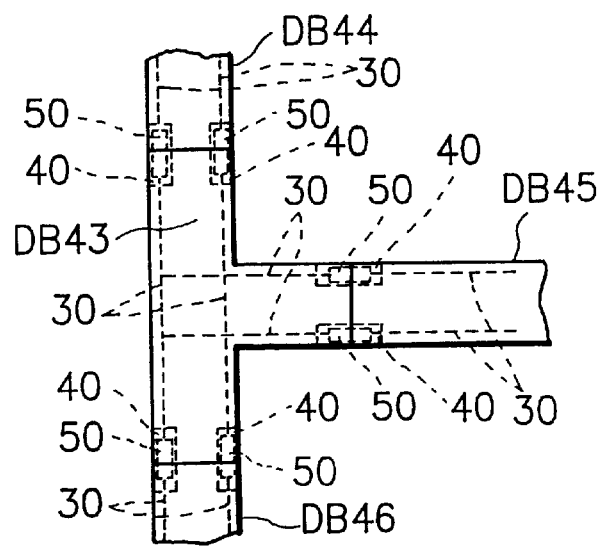
FIG. 39 is a diagram descriptive of a block connecting method which can be utilized for building concrete structures.

FIG. 39 shows a method to connect divided blocks into a T shape. In a T-shaped divided block DB43, connecting rods 30 are buried in parallel and joined to one another, with external thread portions formed at both ends or either end of each connecting rod 30 exposed in cavities 40. In planar-platelike divided blocks DB44 through DB46, connecting rods 30 are buried in parallel, with external thread portions of the connecting rods 30 exposed in cavities 40. To connect these divided blocks DB43 through DB46, first tightening members and second tightening members of connectors 50 are fitted over the external thread portions. After the divided blocks DB43 through DB46 are combined as shown in the drawing, the first tightening members and the second tightening members are tightened.

Figure 40:
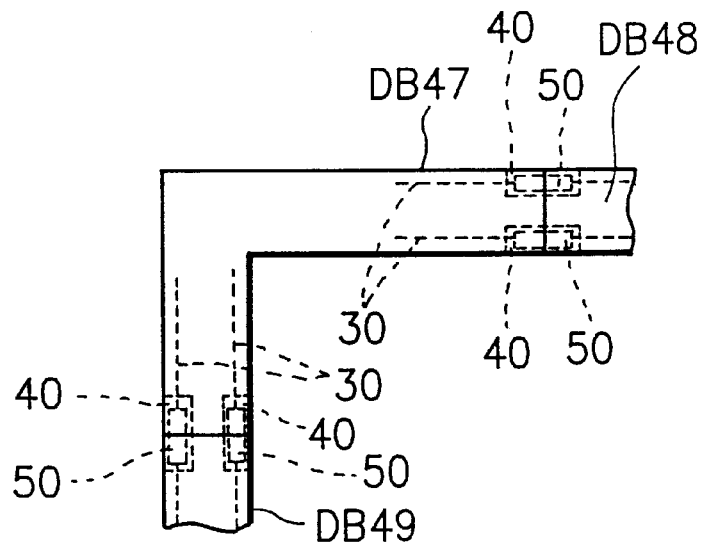
FIG. 40 is a diagram descriptive of a block connecting method which can be utilized for building concrete structures.

FIG. 40 shows a method to connect divided blocks into an L shape. Connecting rods 30 are buried in an L-shaped divided block DB47 in parallel, with external thread portions of the connecting rods 30 exposed in cavities 40. Connecting rods 30 are buried in planar-plate like divided blocks DB48 and DB49 in parallel, with external thread portions of the connecting rods 30 exposed in cavities 40. To connect these divided blocks DB47 through DB4 9 to one another, first tightening members and second tightening members of connectors 50 are fitted over the external thread portions. After the divided blocks DB47 through DB49 are combined as shown in the drawing, the first tightening members and the second tightening members are tightened.

Figure 41:
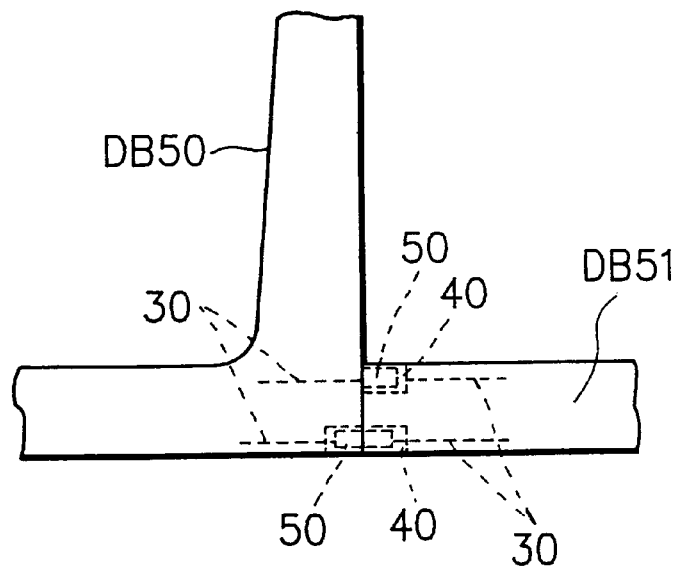
FIG. 41 is a diagram descriptive of a block connecting method which can be utilized for building concrete structures.

FIG. 41 shows a method to connect divided blocks into a T shape. In an L-shaped divided block DB50, connecting rods 30 are buried in parallel with each other, with an external thread portion of one connecting rod 30 exposed to a surface and an external thread portion of the other connecting rod 30 exposed in a cavity 40. In a planar-plate like divided block DB51, connecting rods 30 are buried in parallel with each other, with external thread portions of the connecting rods 30 exposed in cavities 40. To connect these divided blocks DB50 and DB51 to each other, first tightening members and second tightening members of connectors 50 are fitted over the external thread portions respectively. After the divided blocks DB50 and DB51 are combined as shown in the drawing, the first tightening members and the second tightening members are tightened.

Figure 42:
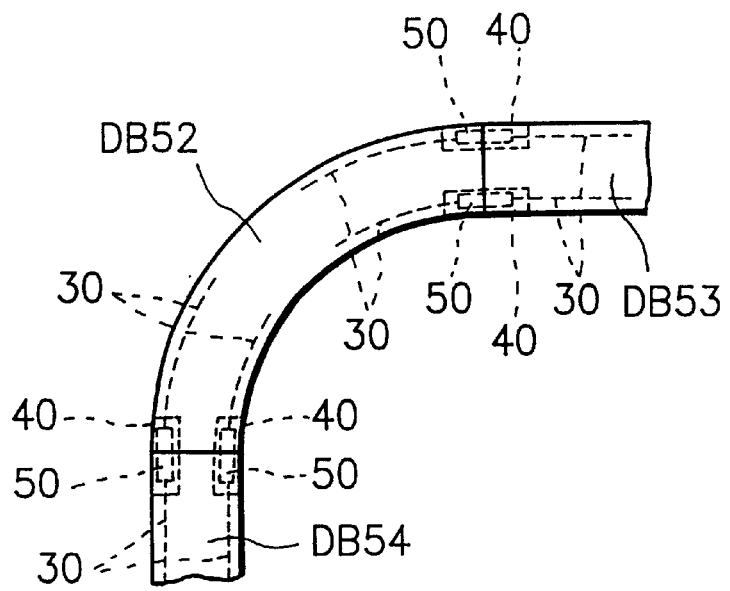
FIG. 42 is a diagram descriptive of a block connecting method which can be utilized for building concrete structures.

FIG. 42 shows a method to connect divided blocks into a curve shape. In a curved divided block DB52, connecting rods 30 are buried along a curved surface, with external thread portions of the connecting rods 30 exposed in cavities 40. In planar-plate like divided blocks DB53 and DB54, connecting rods 30 are buried in parallel, with external thread portions of the connecting rods 30 exposed in cavities 40. To connect these divided blocks DB52 through DB54 to one another, first tightening members and second tightening members of connectors 50 are fitted over the external thread portions. After the divided blocks DB52 through DB54 are combined as shown in the drawing, the first tightening members and the second tightening members are tightened.

Figure 43:
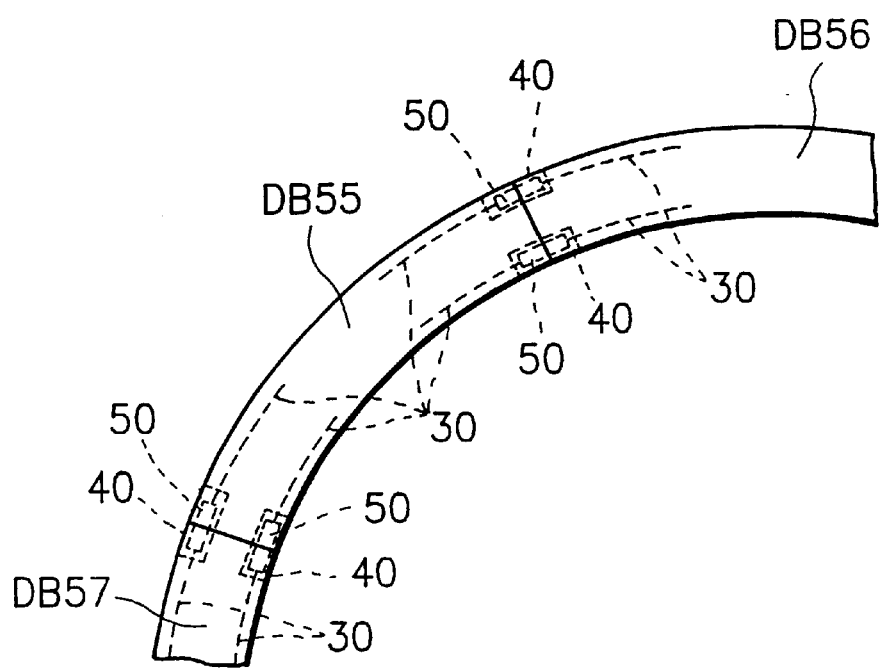
FIG. 43 is a diagram descriptive of a block connecting method which can be utilized for building concrete structures.
Figure 44:
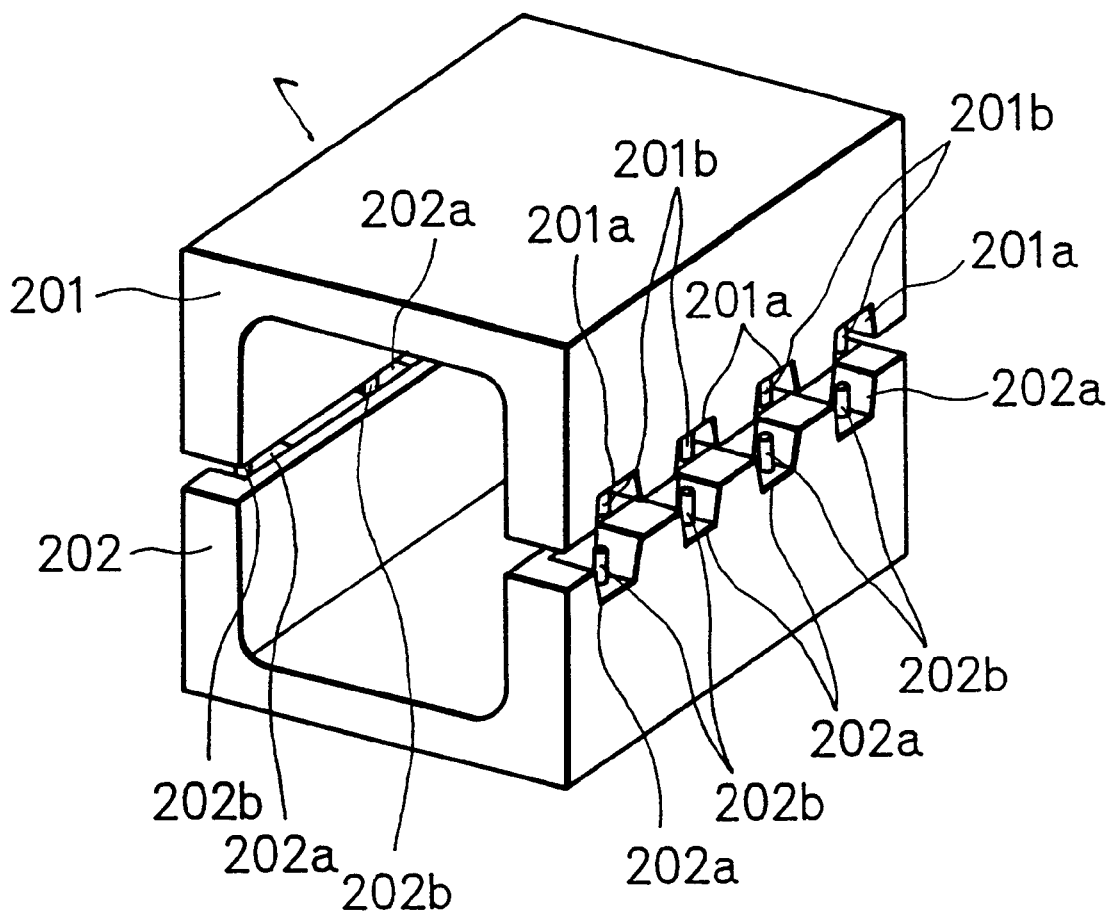
FIG. 44 is a diagram descriptive of a conventional block connecting method.

FIG. 43 shows a method to connect divided blocks into an arc shape. In an arc-shaped divided block DB55, connecting rods 30 are buried along an arc surface, with external thread portions of the connecting rods 30 exposed in cavities 40. In arc-shaped divided blocks DB56 and DB57, connecting rods 30 are buried along arc surfaces, with external thread portions of the connecting rods 30 exposed in cavities 40. To connect these divided blocks DB55 through DB57, first tightening members and second tightening members of connector 50 are fitted over the external thread portions respectively. After the divided blocks DB55 through DB57 are combined as shown in the drawing, the first tightening members and the second tightening members are tightened.

What is claimed is:

1. In combination,
    first and second precast concrete blocks each having a joining face and a cavity recessed in said joining face;
    a first connecting rod buried in the first block, and having an external threaded portion provided at an end thereof exposed in the cavity of the first block;
    a second connecting rod buried in the second block, and having an external threaded portion provided at an end thereof exposed in the cavity of the second block;
    a first cylindrical tightening member receivable within the cavity of the first block, said first tightening member having:
        an internal threaded hole arranged in a central region of the first tightening member, and screwed onto the external threaded portion of the first connecting rod; and
        an external threaded portion extending for a substantial length of a peripheral surface of the first tightening member;
    a second cylindrical tightening member receivable within the cavity of the second block, said second tightening member having:
        a cylindrical hollow space arranged in a central region of the second tightening member;
        an insertion hole arranged at one end of the second tightening member, and loosely inserted outside the second connecting rod;
        an internal threaded portion arranged on an inner surface of said hollow space, and corresponding to and being screwed onto the external threaded portion of the first tightening member; and
        an annular step portion between said insertion hole and said hollow space;
    and
    a nut having an outer dimension smaller than a dimension of the annular step portion of the second tightening member, said nut being screwed onto the external threaded portion of the second connecting rod for limiting movement of the second tightening member in a direction toward said end of the second connecting rod when said nut comes into contact with the annular step portion of the second tightening member;
    the internal threaded portion of the second tightening member being tightened onto the external threaded portion of the first tightening member so that a substantial portion of the first tightening member is received within the hollow space of the second tightening member, said nut being screwed onto the external threaded portion of the second connecting rod until contacting the annular step portion of the second tightening member, the first connecting rod and the second connecting rod being pulled toward each other so that the joining faces of the first and second blocks are pressed together and the cavities of the first and second blocks form a common cavity, the first and second tightening members being in the common cavity, the nut including a face bearing against the annular step portion of the second tightening member when the joining faces of the first and the second blocks are pressed together;
    wherein ridge pitches of the external threaded portion of the first tightening member and the internal threaded portion of the second tightening member are larger than ridge pitches of the external threaded portions of the first connecting rod and the second connecting rod.

2. The combination of claim 1, wherein the nut, after being screwed onto the external threaded portion of the second connecting rod, is fixed to the second connecting rod.

3. A connector for connecting first and second precast concrete blocks to each other, each block including a joining face and a cavity recessed in said joining face, said connector comprising:
    a first connecting rod adapted to be buried in the first block and arranged so that an external threaded portion provided at an end of the first connecting rod is exposed in the cavity of the first block;
    a second connecting rod adapted to be buried in the second block and arranged so that an external threaded portion provided at an end the second connecting rod is exposed in the cavity of the second block;

a first cylindrical tightening member adapted to be received within the cavity of the first block, said first tightening member having:
- an internal threaded hole provided in a central region of the first tightening member, and adapted to be screwed onto the external threaded portion of the first connecting rod; and
- an external threaded portion extending for a substantial length of a peripheral surface of the first tightening member, said first tightening member being disposed on the first connecting rod when the internal threaded hole of the first tightening member is screwed onto the external threaded portion of the first connecting rod;

a second cylindrical tightening member adapted to be received within the cavity of the second block, said second tightening member having:
- a cylindrical hollow space arranged in a central region of the second tightening member;
- an insertion hole provided at an end of the second tightening member, and adapted to be loosely inserted outside of the second connecting rod;
- an internal threaded portion provided on an inner surface of said hollow space, and adapted to be screwed onto the external threaded portion of the first tightening member; and
- an annular step portion disposed between said insertion hole and said hollow space, said second tightening member being disposed on the second connecting rod when the insertion hole is inserted outside of said end of the second connecting rod; and a nut having an outer dimension smaller than a dimension of the annular step portion of the second tightening member, and being adapted to be screwed onto the external threaded portion of the second connecting rod after the second tightening member is disposed on the second connecting rod, said nut further being adapted to come into contact with the annular step portion of the second tightening member thereby limiting movement of the second tightening member in a direction toward said end of the second connecting rod;

the internal threaded portion of the second tightening member being adapted to be tightened onto the external threaded portion of the first tightening member so that a substantial portion of the first tightening member is receivable within the hollow space of the second tightening member; and said nut, the connecting rods and the tightening members being adapted to cooperatively pull said blocks together, thereby causing the joining faces of the first and second blocks to be pressed together and the first and second cavities to form a joint cavity when said nut is tightened against the annular step portion;

wherein ridge pitches of the external threaded portion of the first tightening member and the internal threaded portion of the second tightening member are larger than ridge pitches of the external threaded portions of the first connecting rod and the second connecting rod.

4. The connector according to claim 3, wherein the nut is adapted to be fixed to the second connecting rod after being screwed onto the external threaded portion of the second connecting rod.

\* \* \* \* \*